(12) United States Patent
Nishant et al.

(10) Patent No.: US 12,177,767 B2
(45) Date of Patent: Dec. 24, 2024

(54) METHOD AND USER EQUIPMENT (UE) FOR HANDLING FREQUENCY SCANNING IN WIRELESS COMMUNICATION NETWORK

(71) Applicant: Samsung Electronics Co., Ltd., Suwon-si (KR)

(72) Inventors: Nishant, Bangalore (IN); Nitesh Pushpak Shah, Bangalore (IN); Alok Kumar Jangid, Bangalore (IN); Kailash Kumar Jha, Bangalore (IN); Swapnil Santosh Nivendkar, Bangalore (IN); Aman Agarwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 17/565,719

(22) Filed: Dec. 30, 2021

(65) Prior Publication Data

US 2022/0150807 A1    May 12, 2022

Related U.S. Application Data

(63) Continuation of application No. PCT/KR2021/010883, filed on Aug. 17, 2021.

(30) Foreign Application Priority Data

Aug. 14, 2020  (IN) .............................. 202041035061
Apr. 6, 2021   (IN) .............................. 202141016226
Jul. 5, 2021    (IN) .............................. 202041035061

(51) Int. Cl.
*H04W 48/16*     (2009.01)
*H04W 24/10*     (2009.01)
(Continued)

(52) U.S. Cl.
CPC ........... *H04W 48/16* (2013.01); *H04W 24/10* (2013.01); *H04W 48/14* (2013.01);
(Continued)

(58) Field of Classification Search
CPC ......... H04W 8/26; H04W 8/183; H04W 8/20; H04W 48/16; H04W 24/10; H04W 48/14;
(Continued)

(56) References Cited

U.S. PATENT DOCUMENTS 8,606,261 B2    12/2013  Weng et al.
8,897,224 B2 *  11/2014  Ben-Eli ................. H04W 48/16
                                                         370/328
(Continued)

FOREIGN PATENT DOCUMENTS

CN     106162813 A    11/2016
CN     114071562 A     2/2022
(Continued)

OTHER PUBLICATIONS

"3rd Generation Partnership Project; Technical Specification Group Radio Access Network; NR; User Equipment (UE) radio transmission and reception; Part 1: Range 1 Standalone (Release 16)", 3GPP TS 38.101-1 V16.4.0 (Jun. 2020), 406 pages.
(Continued)

*Primary Examiner* — Brian T O Connor

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. Accordingly, methods for handling frequency scanning in a wireless communication network include scanning, by a UE, a first set of frequencies present in a Most Recently Used (MRU) frequency list.

20 Claims, 15 Drawing Sheets

(51) Int. Cl.
*H04W 48/14* (2009.01)
*H04W 56/00* (2009.01)
*H04W 72/0453* (2023.01)
*H04W 84/04* (2009.01)

(52) U.S. Cl.
CPC ...... *H04W 72/0453* (2013.01); *H04W 56/001* (2013.01); *H04W 84/042* (2013.01)

(58) Field of Classification Search
CPC ........... H04W 72/0453; H04W 56/001; H04W 84/042; H04W 24/02; H04W 48/18; H04W 88/06
See application file for complete search history.

(56) References Cited

U.S. PATENT DOCUMENTS

| | | | |
|---|---|---|---|
| 10,694,460 B2* | 6/2020 | Ingale | H04W 68/005 |
| 11,825,556 B2* | 11/2023 | Lu | H04W 8/18 |
| 2009/0258645 A1 | 10/2009 | Ramkull et al. | |
| 2017/0135032 A1 | 5/2017 | Huang et al. | |
| 2018/0152872 A1 | 5/2018 | Wirtanen et al. | |
| 2018/0227839 A1 | 8/2018 | Wang et al. | |
| 2019/0036634 A1 | 1/2019 | Cheng et al. | |
| 2019/0288813 A1 | 9/2019 | John Wilson et al. | |
| 2020/0359200 A1 | 11/2020 | Lu et al. | |
| 2020/0396045 A1 | 12/2020 | Wang et al. | |
| 2021/0058970 A1* | 2/2021 | Kwak | H04L 5/0064 |
| 2021/0153089 A1 | 5/2021 | Nayak et al. | |
| 2022/0232642 A1* | 7/2022 | Ko | H04L 5/0064 |
| 2022/0386108 A1* | 12/2022 | Venkataraman | H04W 76/16 |

FOREIGN PATENT DOCUMENTS

| | | |
|---|---|---|
| CN | 114071655 A | 2/2022 |
| GB | 2585466 A | 1/2021 |
| KR | 10-2005-0080332 A | 8/2005 |
| WO | 2019/162920 A1 | 8/2019 |
| WO | 2019/245562 A1 | 12/2019 |
| WO | 2020/125424 A1 | 6/2020 |

OTHER PUBLICATIONS

"3rd Generation Partnership Project; Technical Specification Group Radio Access Network; NR; User Equipment (UE) radio transmission and reception; Part 2: Range 2 Standalone (Release 16)" 3GPP TS 38.101-2 V16.4.0 (Jun. 2020), 172 pages.
"3rd Generation Partnership Project; Technical Specification Group Core Network and Terminals; Non-Access-Stratum (NAS) functions related to Mobile Station (MS) in idle mode (Release 15)", 3GPP TS 23.122 V15.7.0 (Mar. 2019), 65 pages.
International Search Report dated Nov. 26, 2021 in connection with International Patent Application No. PCT/KR2021/010883, 4 pages.
Written Opinion of the International Searching Authority dated Nov. 26, 2021 in connection with International Patent Application No. PCT/KR2021/010883, 5 pages.
Examination Report dated Mar. 16, 2022, in connection with Indian Application No. 202041035061, 6 pages.
Supplementary European Search Report dated Nov. 28, 2023, in connection with European Patent Application No. 21856307.0, 16 pages.
Samsung et al., "Way Forward on Minimum CHBW and SCS for SS/PBCH." R4-1711817, 3GPP TSG-RAN WG4 RAN4#84bis, Dubrovnik, Croatia, Oct. 9-13, 2017, 8 pages.

* cited by examiner

900

(5G full band scan sequence)
Bands priority: n41 > n77 > n78
Operator cell availble at GSCN
8045 (334$^{th}$ GSCN of n78)

904  PLMN-GSCN List

| PLMN/ EHPLMN | GSCN | NR-ARFCN | SSB block pattern |
|---|---|---|---|
| 450-02 | 8045 | 628062 | C |
| 310-04 | 22291 | 2026745 | D |

902 n78 (20-50 msecs)
GSCN 334$^{th}$
8045

NR operator

Quick 5G camping

METHOD AND USER EQUIPMENT (UE) FOR HANDLING FREQUENCY SCANNING IN WIRELESS COMMUNICATION NETWORK

CROSS-REFERENCE TO RELATED APPLICATIONS

This application is a continuation of International Application No. PCT/KR2021/010883 filed on Aug. 17, 2021, which claims priority to India Patent Application No. 202041035061 filed on Aug. 14, 2020, India Patent Application No. 202141016226 filed on Apr. 6, 2021, and India Patent Application No. 202041035061 filed on Jul. 5, 2021, the disclosures of which are herein incorporated by reference in their entirety.

BACKGROUND

1. Field

Embodiments disclosed herein relate to a wireless communication network, and more particularly related to methods and user equipment (UE) for handling frequency scanning in the wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Full-Spectrum K-distribution (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, in a wireless communication network, frequency scan time for camping is an important Key Performance Indicator (KPI). In fifth generation (5G) systems, there are two types of Frequency ranges supported: Frequency Range-1 (FR1, less than 6 GHz) and Frequency Range-2 (FR2, above 24 GHz). Because of the higher frequency spectrums, the band sizes in the 5G system are wide and the number of frequencies in each band is also high. In order to scan one single NR frequency, minimum of 20 ms to 50 ms (plus additional processing time) is required just to tell whether any Synchronization Signal Block (SSBs) are present in the frequency or not. In an example, scanning of n78 band will take at least 7-17 Secs (n78 has 340 Global Synchronization Channel Numbers (GSCNs) i.e., [340*20/50 ms=7-17 secs]). As a result, the full band scan time for cell selection is very high as a User Equipment (UE) would need to scan for all the frequencies in a band (to check if there are any suitable cells available for camping) and then repeat the process for multiple NR bands (under FR1 and FR2 Bands). This leads to delay in 5G camping and would give a very bad user experience.

The number of Global Synchronization Channel Numbers (GSCNs) to be scanned for each band is high, and it is time consuming to scan each and every GSCN for the current band. If no suitable cell is found for the scanned band, the process needs to be repeated for the next 5G band in the band priority order and would again increase the 5G full band scanning time. If the UE supports both FR1 and FR2 NR Bands, the number of bands would also increase and the overall 5G full band scanning time would be very high. Hence, the full band scan time in a 5G standalone (SA) is going to be large causing delay in the service.

The principal object of the embodiments herein is to disclose a method and a system to optimize a new radio (NR) frequency scanning.

Another object of the embodiments herein is to provide a faster 5G camping experience to a user of the UE.

Another object of the embodiments herein is to scan a plurality of frequencies present in a Most Recently Used (MRU) frequency list.

Another object of the embodiments herein is to detect a failure to connect the plurality of frequencies in the MRU frequency list.

Another object of the embodiments herein is to determine a plurality of frequencies supported by a registered Public Land Mobile Network (PLMN) other than the MRU frequency list.

Another object of the embodiments herein is to scan the plurality of frequencies supported by the registered PLMN.

Another object of the embodiments herein is to connect to at least one frequency available from the plurality of frequencies supported by the registered PLMN.

Another object of the embodiments herein is to initiate a full frequency band scan if no frequency from the plurality of frequencies supported by the registered PLMN are available.

SUMMARY

Accordingly, embodiments herein disclose methods for handling a frequency scanning in a wireless communication network. The method includes scanning, by a UE, a first set of frequencies present in an MRU frequency list. Further, the method includes detecting, by the UE, a failure to connect to at least one frequency from the first set of frequencies present in the MRU frequency list. Further, the method includes determining, by the UE, a second set of frequencies supported by a PLMN, wherein the second set of frequencies is different from the first set of frequencies. Further, the method includes scanning, by the UE, the second set of frequencies supported by the registered PLMN. Further, the method includes connecting to at least one frequency from the second set of frequencies supported by the registered PLMN based on the scanning.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

The proposed embodiment can lead to a differentiating feature for UE over competitors by giving faster 5G camping experience.

The proposed embodiment can be used to optimize NR frequency scanning time for quick scan and procedures to find SSB frequency position in single search. In the proposed embodiment, in case of automatic network selection, camping will be faster by scanning the GSCN fetched from PLMN-GSCN list stored within the UE and scanning just the corresponding GSCN values. Further, for roaming scenarios, the scan will be performed only for the GSCNs corresponding to roaming MCC/PLMN and other entries would be skipped.

In the proposed embodiment, in the manual selection mode, using just the corresponding GSCN values from the PLMN-GSCN list, the scanning will be faster as complete band scanning will not be required.

BRIEF DESCRIPTION OF THE DRAWINGS

The embodiments disclosed herein are illustrated in the accompanying drawings, throughout which like reference letters indicate corresponding parts in the various figures.

The embodiments herein will be better understood from the following description with reference to the drawings, in which.

DETAILED DESCRIPTION

Figure 1:
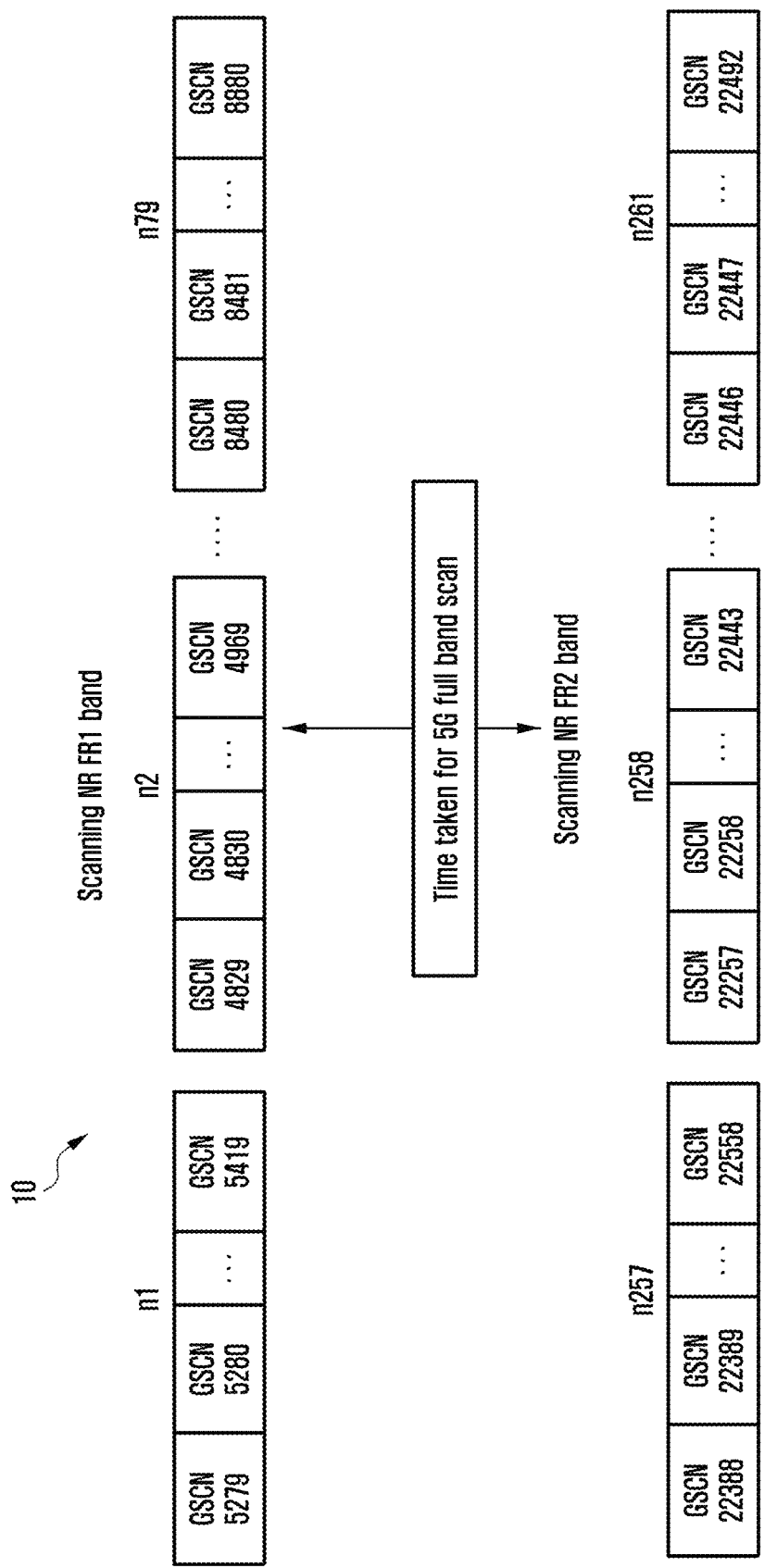
FIG. 1 illustrates an example in which total time taken for a 5G full band scan, according to other systems that are not embodiments as disclosed herein.

The number of Global Synchronization Channel Numbers (GSCNs) to be scanned for each band is high, and it is time consuming to scan each and every GSCN for the current band. If no suitable cell is found for the scanned band, the process needs to be repeated for the next 5G band in the band priority order and would again increase the 5G full band scanning time. If the UE supports both FR1 and FR2 NR Bands, the number of bands would also increase and the overall 5G full band scanning time would be very high. Hence, the full band scan time in a 5G SA is going to be large causing delay in the service.

In an example, below details are NR operating bands (as per 3GPP specification reference). FR1 Time Division Duplexing (TDD) bands as defined in 38.101-01 are as wide as 900 MHz (Band n77) shown in the table 1. In another example, FR2 TDD Bands as defined in 38.101-02 are as wide as 3250 MHz (Band n258) shown in the table 2.

TABLE 1

Table 5.2-1: NR operating bands in FR1

| NR operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD[1] |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-962 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

NOTE 1:
UE that complies with the NR Band n50 minimum requirements in this specification shall also comply with the NR Band n51 minimum requirements.
NOTE 2:
UE that complies with the NR Band n75 minimum requirements in this specification shall also comply with the NR Band n76 minimum requirements.

TABLE 2

Table 5.2-1: NR operating bands in FR1

| operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

The overall scanning time for such wide bands by scanning each and every SSB frequency would be too high and lead to delay in NR camping.

Position of SSB Frequencies in NR Band: Each 5G band consists of multiple frequencies. Tables 3 and 4 indicate the SS block frequency position within the NR bands. A global synchronization raster is defined for all frequencies. The frequency position of the SS block is defined as $SS_{REF}$ with corresponding number GSCN. The synchronization raster indicates the frequency positions of the synchronization block that can be used by the UE for system acquisition when explicit signaling of the synchronization block position is not present. The UE uses synchronization raster to scan frequencies for SSBs. Based on the GSCN only, the UE can find SSB and NR for camping. As per the tables 3 and 4, there are around 22254 SSB frequencies in FR1 while 4384 SSB frequencies in the FR2. Table 3 corresponds to FR1 GSCN as defined in 3GPP Technical Specification (TS) 38.101-1, and Table 4 corresponds to FR2 GSCN as defined in 3GPP TS 38.101-2.

TABLE 3

Table 5.4.3.1-1: GSCN parameters for the global frequency raster

| Frequency range | SS Block frequency position $SS_{REF}$ | GSCN | Range of GSCN |
|---|---|---|---|
| 0-3000 MHz | N*1200 kHz + M*50 kHz, N = 1:2499, M ∈ {1, 3, 5} (Note 1) | 3N + (M − 3)/2 | 2-7498 |
| 3000-24250 MHz | 3000 MHz + N*1.44 kHz N = 0:14756 | 7499 + N | 7499-22255 |

NOTE 1:
The default value for operating bands with SCS spaced channel raster is M = 3

TABLE 4

Table 54.3.1-1: GSCN parameters for the global frequency raster

| Frequency range | SS Block frequency position $SS_{REF}$ | GSCN | Range of GSCN |
|---|---|---|---|
| 24250-100000 MHz | 24250.08 MHz + N*17.28 MHz, N = 0:4383 | 22256 + N | 22256-26639 |

Conventional 5G Band Scanning Time: The Synchronization raster is determined for the 5G Band to be scanned using the below formula:

Synchronization Raster=Min. Channel BW−SSB BW+Channel Raster

BW is an abbreviation of bandwidth. In an example: Calculation for Band n78: Sync Raster=8.64 MHz−7.2 MHz+30 kHz=1.44 MHz+30 KHz=1.47 MHz.

Once the Synchronization raster size is determined, the UE needs to scan the corresponding band using the calculated Synchronization raster size (1.47 MHz in case of n78). The UE will spend at least 20 to 50 milliseconds (ms) on each GSCN (of the band which is being scanned) to determine whether NR cell is present or not. (This is because of default SSB periodicity of 20 ms). If UE doesn't find any NR cell in the scanned band, the process is repeated for other supported NR bands.

Scanning Time for few NR Bands:
GSCN in Band n41=314 GSCN
(6717−6246)/3=157 GSCNs for one SCS. Band n41 has two SCS config, so a total of 314 GSCNs (157*2). 314 GSCNs to be scanned in n41 band.
 Minimum possible scanning time=314*20/50 ms=~6.5-16 sec
GSCN in Band n77=618 GSCN:
(8329−7711)=618 GSCNs. So, 618 GSCNs to be scanned in n77 band.

Minimum possible scanning time=618*20/50 ms=~12.5–31 sec

GSCN in Band n78=340 GSCN (8051–7711)=340 GSCNs. So, 340 GSCNs to be scanned in n78 band.

Minimum possible scanning time=340*20/50 ms=~7.0–17 sec

In a conventional system, whenever the UE powers on, the UE scans Most Recently Used (MRU) frequencies of the RPLMN followed by full band scan. Whenever the UE boots up in a new area or goes to a roaming area or out of service (OOS) area, the MRU scan doesn't yield result and the UE needs to trigger full band scan which will take more time.

Whenever the UE initiates a 5G scan (for Power-on Camping/Out-of-Service Recovery/Roaming Area camping etc.,) to determine if there is any suitable 5G cell available, the UE first scans the MRU list frequencies for 5G and if there is no cell available, the UE triggers the full band 5G scan (for supported NR bands). During the full band 5G scan, the UE starts scanning each and every supported 5G Band as per band priority order. The 5G Band Scan triggers as follows:

The UE checks for each and every GSCN for the current 5G band being scanned to determine if there are any suitable cells available for a current operator.

If no suitable cell is found in the current band, the UE checks for the next 5G Band as per band priority order and the process is repeated.

The time taken for scanning each GSCN can range from 20 ms to 50 ms (just to determine whether any 5G cell is available or not). If the 5G cell is available, the UE would again take more time to determine whether this cell is suitable cell or not for current operator. The number of GSCNs to be scanned for each band is high, and it is time consuming to scan each and every GSCN for the current band. If no suitable cell is found for the scanned band, the process needs to be repeated for the next 5G band in the Band Priority order and would again increase the 5G Full Band Scanning Time.

If the UE supports both FR1 and FR2 NR Bands, the number of bands would also increase and the overall 5G full band scanning time would be very high. Full Band Scan Time in 5G SA is going to be large causing delay in the service. Similarly, when Manual Scan is triggered in 5G mode, the UE would consume too much of time to report all the available PLMNs in that area (as Full band Scan would be delayed due to scanning of all the GSCNs for all the bands). A very bad user experience occurs when a user has to wait for a long time to get 5G service on the device.

FIG. 1 illustrates an example 10 in which total time taken for a 5G full band scan, according toother systems that are not embodiments as disclosed herein. As shown in the FIG. 1, total time taken for 5G Full Band Scan=n1 time+n2 time+time for n3 through n78+n79 time+n257 time+time for n258 through n260+n261 time (for every GSCN for each band).

Figure 2:
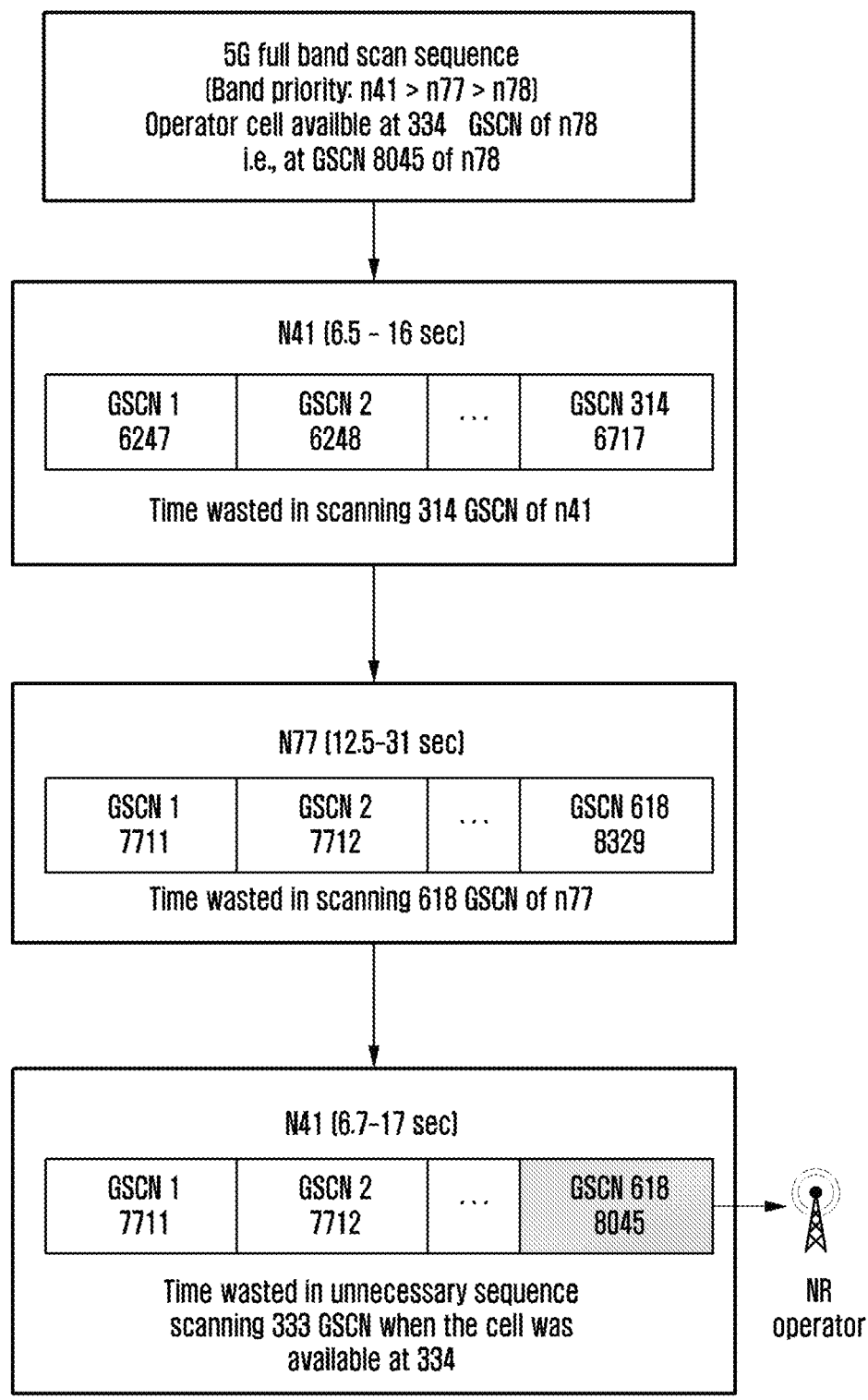
FIG. 2 illustrates an example in which a method for optimizing a NR frequency scanning in an automatic selection mode, according to other systems that are not embodiments as disclosed herein.

FIG. 2 illustrates an example 20 in which a method for optimizing the NR frequency scanning in an automatic selection mode. In this example 20, the band priority order be n41>n77>n78. In the current location, the only suitable cell is available for n78, and the suitable cell n78 is located at GSCN 8045 i.e., 334$^{th}$ position out of the 340 GSCN supported for n78 (GSCN 7711 to GSCN 8051).

Based on the current implementation, during the automatic selection mode, the UE starts scanning each and every GSCN of the 5G Bands (as per the band priority order) and camps whenever the UE gets a suitable cell for the current operator. The UE would scan for each and every GSCN for n41 (314 GSCNs) followed by 618 GSCNs for n77. Since no cell is found, the UE would start scanning for each and every GSCN for n78. No suitable cell found till 333 GSCNs of n78. At the 334$^{th}$ GSCN (i.e., GSCN 8045) of n78, the UE gets a suitable cell and camps on the suitable cell. The extra time spent on scanning 314 GSCNs of n41, 618 GSCNs of n77 and sequential scanning of 333 GSCNs of n78 leads to a lot of delay in the 5G camping.

In existing methods, in an example, the UE went to out-of-service in a home country. The MRU scan yields no result. Further, the UE performs the PLMN search for the RPLMN followed by the HPLMN and other priority PLMNs. While performing full band scan for the selected PLMN, the UE would search all the GSCNs sequentially for all the supported NR bands one after another. This would lead to delay in the NR camping.

In existing methods, in another example, the UE boots up in a new area where the MRU frequency is not found. Further, the UE performs the PLMN search for RPLMN followed by the HPLMN and other priority PLMNs. While performing the full band scan for the selected PLMN, the UE would search all the GSCNs sequentially for all the supported NR bands one after another. This would lead to delay in NR camping.

In existing methods, in another example, the UE boots up in a new country. Through the MCC scan, new country is detected. Further, the UE will not perform RPLMN/HPLMN scan for this. Further, the UE is expected to perform Full band scan on OPLMN or random PLMN. While performing Full Band Scan for the selected PLMN, the UE would search all the GSCNs sequentially for all the supported NR bands one after another. This would lead to delay in NR camping.

In existing methods, in another example, the UE boots up in a new area in a roaming country where MRU frequency is not found. Further, the UE performs PLMN search for RPLMN followed by OPLMN and other priority PLMNs. While performing full band scan for the selected PLMN, the device would search all the GSCNs sequentially for all the supported NR bands one after another. This would lead to delay in NR camping.

Figure 3:
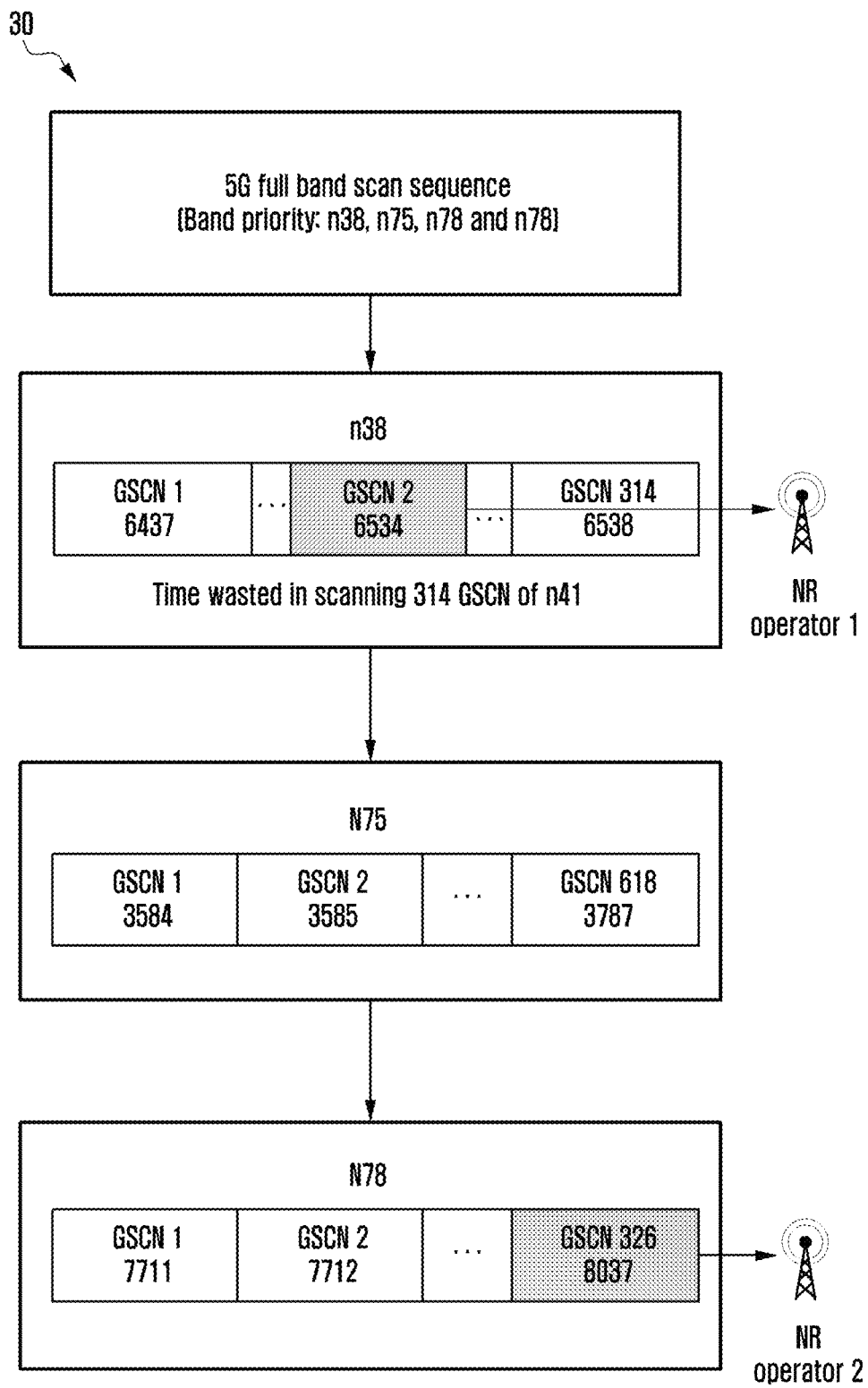
FIG. 3 illustrates an example in which a method for optimizing the NR frequency scanning in a manual selection mode, according to other systems that are not embodiments as disclosed herein.

FIG. 3 illustrates an example 30 in which a method for optimizing the NR frequency scanning in a manual selection mode. In this example 30, the supported bands by the UE be n38, n66, n75, n78, and n257. Based on the current implementation, in the manual mode selection, the UE needs to scan all bands in order to report every available PLMN of all the operators at the UE's location. But the manual selection is very time consuming as search takes place in background and takes a lot of time in band searching, decoding the detected SSB Frequency and then populating the PLMN list for the user selection. Though the PLMN availability would be limited and available at certain GSCNs of the band but still complete search of all the 5G Bands is done. The UE would scan for each and every GSCN for all the supported bands. There might be certain bands which might not have any PLMNs available. Also, the cells for the operators would be available only at certain GSCN of the 5G Band but UE would still search for each and every GSCN of the 5G Band. The extra time spent on scanning bands without any PLMN available and the time spent on sequential scanning for all the GSCNs of the 5G Band when cell is available only at specific GSCN would lead to a lot of delay in 5G camping.

Thus, it is desired to address the above mentioned disadvantages or other shortcomings or at least provide a useful alternative.

In an embodiment, determining, by the UE, the second set of frequencies supported by the registered PLMN includes acquiring, by the UE, a PLMN-Global Synchronization Channel Number (PLMN-GSCN) list, determining at least one GSCN associated with the registered PLMN based on the acquired PLMN-GSCN list, and determining, by the UE, the second set of frequencies supported by the registered PLMN based on the at least one determined GSCN.

In an embodiment, the PLMN-GSCN list comprises at least one of the PLMN, an Equivalent PLMN (EPLMN), the GSCN, a New Radio Absolute Radio Frequency Channel Number (NR-ARFCN), or a Synchronization Signal Block (SSB) block pattern.

In an embodiment, scanning, by the UE, the second set of frequencies supported by the registered PLMN includes determining, by the UE, whether the UE is in a home PLMN, performing, by the UE, one of: indicating a physical layer to scan at least one GSCN corresponding to at least one of a home PLMN (HPLMN) or an EPLMN upon determining that the UE is in the home PLMN, and indicating a physical layer to scan at least one GSCN corresponding to a roaming PLMN (RPLMN) based on a Mobile Country code (MCC) upon determining that the UE is not in the home PLMN, determining, by the UE, that the at least one GSCN for the PLMN is present in a memory, scanning, by the UE, the at least one GSCN retrieved from the memory based on the determination, and identifying, by the UE, a SSB from the at least one scanned GSCN retrieved from the memory.

In an embodiment, scanning, by the UE, the second set of frequencies supported by the registered PLMN includes determining, by the UE, whether the UE is in a home MCC, performing, by the UE, one of: determining that at least one PLMN corresponding to a roaming MCC is present in a memory upon determining that the UE is in the home MCC and indicating a physical layer to scan at least one GSCN corresponding to at least one a HPLMN and an EPLMN, and determining that at least one PLMN corresponding to a home MCC is present in the memory upon determining that the UE is not in the home MCC and indicating a physical layer to scan the at least one GSCN corresponding to a roaming PLMN based on the home MCC, determining, by the UE, that the at least one PLMN is discovered, and causing to display, by the UE, the at least one discovered PLMN to a user of the UE.

In an embodiment, the method further includes triggering, by the UE, a full frequency band scan upon determining that the at least one frequency from the second set of frequencies supported by the registered PLMN is not present.

In an embodiment, the full frequency band scan is triggered when at least one PLMN corresponding to a home MCC is not present in a memory, the at least one PLMN corresponding to a roaming MCC is not present in the memory, the at least one PLMN is not discovered, and at least one GSCN for the at least one PLMN is not present in the memory.

In an embodiment, connecting, by the UE, to the at least one frequency present from the second set of frequencies supported by the registered PLMN includes detecting that at least one frequency in the second set of frequencies is associated with a band having a dual Subcarrier Spacing (SCS) capability having a higher Subcarrier Spacing and a lower Subcarrier Spacing, selecting a higher SCS value for scanning, checking presence of an energy signature and an associated frequency-segment indicating a signal transmission over the at least one frequency while scanning the band with the higher SCS, and performing one of: decoding an SSB with the higher SCS to camp on the at least one frequency, if the energy signature is detected during the scanning and proceed for camping, and detecting an end of band if the energy signature is not detected during the scanning using the higher SCS.

In an embodiment, the method includes detecting a failure in decoding the SSB with the higher SCS. Further, the method includes scanning the frequency-segment (e.g., raster-segment) using a lower SCS. Further, the method includes decoding the SSB with the lower SCS to camp to the at least one frequency.

In an embodiment, the second set of frequencies supported by the registered PLMN is determined when the UE is in at least one of a roaming area, an out of service (OOS) area, or a new service area.

In an embodiment, the MRU list comprises at least one frequency information associated with at least one band connected by the UE over a period of time.

In an embodiment, information on the second set of frequencies supported by the registered PLMN is maintained by at least one of the UE, a network element, or a server.

In an embodiment, information on the second set of frequencies supported by the registered PLMN is maintained and updated by the server, where the server sends an updated about a PLMN-GSCN list to the UE.

Accordingly, embodiments herein disclose a UE for handling a frequency scanning in a wireless communication network. The UE includes a processor and a memory storing an MRU frequency list. A frequency scanning controller coupled with the processor and the memory. The frequency scanning controller is configured to scan a first set of frequencies present in the MRU frequency list. Further, the frequency scanning controller is configured to detect a failure to connect to at least one frequency from the first set of frequencies present in the MRU frequency list. Further, the frequency scanning controller is configured to determine a second set of frequencies supported by a PLMN, where the second set of frequencies is different from the first set of frequencies. Further, the frequency scanning controller is configured to scan the second set of frequencies supported by the registered PLMN. Further, the frequency scanning controller is configured to connect to at least one frequency from the second set of frequencies supported by the registered PLMN based on the scanning.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The terms "UE" and "device" are used interchangeably in the patent disclosure. The terms "memory", "database" and "DB" are used interchangeably in the patent disclosure.

The embodiments herein achieve methods for handling a frequency scanning in a wireless communication network. The method includes scanning, by a UE, a first set of frequencies present in an MRU frequency list. Further, the method includes detecting, by the UE, a failure to connect to at least one frequency from the first set of frequencies present in the MRU frequency list. Further, the method includes determining, by the UE, a second set of frequencies supported by a PLMN, wherein the second set of frequencies is different from the first set of frequencies. Further, the method includes scanning, by the UE, the second set of frequencies supported by the registered PLMN. Further, the method includes connecting to at least one frequency from the second set of frequencies supported by the registered PLMN based on the scanning.

Unlike conventional methods, the method according to embodiments of this disclosure can be used to significantly reduce the 5G full band scanning time by fetching the GSCNs to be scanned specifically from the PLMN-GSCN list and perform a quick scan for that GSCN only to get faster 5G service. Even for manual mode selection and roaming cases, the 5G scan would be very fast using the GSCN from the PLMN-GSCN list and could give faster 5G service and even save UE resources like battery consumption. Overall user experience is enhanced, and users get faster 5G service which would be a very important 5G KPI.

The method can be used to optimize NR frequency scanning time by introducing the PLMN-GSCN list containing PLMN-GSCN information to be used by the UE for quick scan and procedures to find SSB frequency position in single search. In the proposed method, in case of automatic network selection, camping will be faster by scanning the GSCN fetched from PLMN-GSCN list stored within the UE and scanning just the corresponding GSCN values. Further, for roaming scenarios, the scan will be performed only for the GSCNs corresponding to roaming MCC/PLMN and other entries would be skipped. The list is also maintained by the server so that the server will contain all the deployed GSCNs across the globe or the regions. The latest version of list, which when needed, will be pushed to the UEs by the server.

In the proposed method, in the manual selection mode, using just the corresponding GSCN values from the PLMN-GSCN list, the scanning will be faster as complete band scanning will not be required. If all PLMNs are found corresponding to MCC then complete band scan will not be required and if all PLMN entries corresponding to MCC are not available in local GSCN-PLMN list, then UE will pull latest GSCN-PLMN List from a server before the scan.

In the proposed methods, for bands supporting Dual SCS, the UE to start scanning of bands using higher SCS because step size will be more. The scanning using highest SCS will have smaller steps with lower search time. The scanning with higher SCS will help in decoding both types of SCS.

In the proposed methods, the different operators are deploying NR in different bands, but the GSCN used are limited. These operators choose certain RF channel frequency and SSB frequency based on spectrum allocation for NR deployment. Also, once the SSB positions are fixed by network operators based on GSCN, the SSB positions are not likely to change because of deployment planning, spectrum and other complexities. Since the operators are deploying NR on limited GSCNs, prior knowledge of GSCN will provide the location (for example, an exact location) of SSB frequency and thus the NR cell. The proposed method uses prior information of GSCN on which NR cell is deployed in a PLMN and thus reduces the 5G Full Band Scan time significantly. Further, the proposed method uses the below three step algorithm to reduce the 5G Full Band Scanning time for faster camping experience.

The method can be used for scanning the list of frequencies supported by the registered PLMN in case of no service found on the most recently used frequency scan, so as to camp the UE on to the network faster compared to the full band scan in a quick manner.

In an example, the UE went to the out-of-service in the home country. Further, the UE scans the first set of frequencies present in the MRU frequency list. The MRU frequency list only includes the first set of frequencies and does not include the registered PLMN. Further, the UE detects that the failure to connect the first set of frequencies present in the MRU frequency list. Based on the proposed methods, the UE performs the PLMN search for the RPLMN followed by HPLMN and other priority PLMNs. While performing full band scan for the selected PLMN, the UE should search GSCN/frequency as per selected PLMN from the GSCN-PLMN list first. This would lead to faster NR camping without performing full-band search.

Referring now to the drawings, and more particularly to FIGS. 4 through 14, where similar reference characters denote corresponding features consistently throughout the figures, there are shown at least one embodiment.

Figure 4:
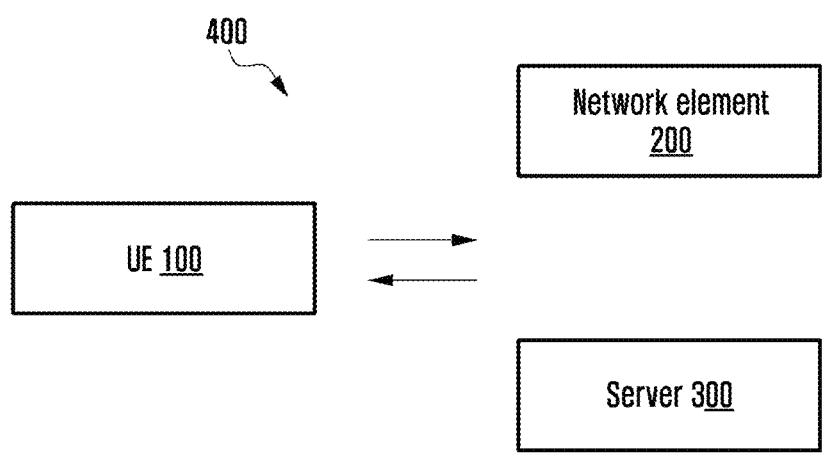
FIG. 4 illustrates an overview of a wireless communication network for handling a frequency scanning, according to embodiments as disclosed herein.

FIG. 4 illustrates a wireless communication network 400 for handling a frequency scanning, according to embodiments as disclosed herein. In an embodiment, the wireless communication network 400 includes a UE 100, a network element 200, and a server 300. The UE 100 can be, for example, but not limited to a cellular phone, a smart phone, a smart watch, a smart fridge, a smart television (TV), a smart washing machine, a smart dishwasher, a Closed-circuit television (CCTV), a Personal Digital Assistant (PDA), a tablet computer, a laptop computer, a virtual reality device, an immersive system, an Internet of Things (IoT), a smart sensor, a drone, a smart vehicle or the like. The network element 200 may also include or be referred to by those skilled in the art as a base station, a base transceiver station, a radio base station, an access point, a radio transceiver, an eNB, a gNodeB (GNB), a 5G eNB, a transmission reception point (TRP), deployed on a radio access network (RAN), a virtualized radio access network (vRAN), Cloud RAN functionality or the like. The server 300 can be, for example, but not limited to an edge server, a cloud server, a third party server or the like. The wireless communication network 400 can be, for example, but not limited to a Narrowband Internet-of-Things (NB-IoT) network, a fifth generation (5G) network, an edge computing network, a sixth generation (6G) network, a Long-Term Evolution (LTE) network, a Long-Term Evolution-Advanced (LTE-A) network or the like. The frequency scanning can be a NR frequency scanning.

In an embodiment, the UE 100 is configured to scan a first set of frequencies present in the MRU frequency list. The MRU frequency list includes at least one frequency information associated with at least one band connected by the UE 100 over a period of time. Further, the UE 100 is configured to detect a failure to connect to at least one frequency from the first set of frequencies present in the MRU frequency list.

Further, the UE 100 is configured to determine a second set of frequencies supported by a PLMN. The second set of frequencies are different from the first set of frequencies. The information on the second set of frequencies supported by the registered PLMN is maintained by the UE 100, the network element 200 and the server 300.

In an embodiment, the second set of frequencies supported by the registered PLMN is determined by acquiring a PLMN-GSCN list, determining a GSCN associated with the registered PLMN based on the acquired PLMN-GSCN list, and determining the second set of frequencies supported by the registered PLMN based on the determined GSCN. The PLMN-GSCN list includes the PLMN, an EPLMN, the GSCN, a New Radio Absolute Radio Frequency Channel Number (NR-ARFCN), and a Synchronization Signal Block (SSB) block pattern. The second set of frequencies supported by the registered PLMN is determined when the UE 100 is in a roaming area, an OOS area and a new service area. In an embodiment, the PLMN-GSCN list is maintained by the server 300 and be stored locally in the UE 100. The PLMN-GSCN list is prepared by the server 300 based on different locations 5G deployments. This PLMN-GSCN list is pushed by the server 300 to the UE 100 whenever the UE 100 comes in connected mode so that the UE obtains the latest updated list. In the UE 100, GSCN and PLMNs list is stored in memory based on the network operator and a region of the service.

Based on the determination, the UE 100 is configured to scan the second set of frequencies supported by the registered PLMN. In an embodiment, the UE 100 is configured to determine whether the UE 100 is in a home PLMN. If the UE 100 is in the home PLMN then, the UE 100 indicates a physical layer (i.e., L1 layer) to scan a GSCN corresponding to at least one of a HPLMN and an EPLMN. If the UE 100 is not in the home PLMN then, the UE 100 indicates the physical layer to scan at least one GSCN corresponding to a RPLMN based on an MCC. Further, the UE 100 is configured to determine that the GSCN for the PLMN is present in a memory (as shown in the FIG. 5). Further, the UE 100 is configured to scan the GSCN retrieved from the memory based on the determination. Further, the UE 100 is configured to identify a SSB from the scanned GSCN retrieved from the memory. The detailed operations for optimizing the NR frequency scanning when the UE 100 is in the automatic selection mode are explained in the FIG. 7.

In another embodiment, the UE 100 is configured to determine whether the UE 100 is in a home MCC. If the UE 100 is in the home MCC then, the UE 100 determines that the PLMN corresponding to a roaming MCC is present in the memory and indicates the physical layer to scan the GSCN corresponding to the HPLMN and the EPLMN. If the UE 100 is not in the home MCC then, the UE 100 determines that the PLMN corresponding to the home MCC is present in the memory and indicates the physical layer to scan the GSCN corresponding to the roaming PLMN based on the home MCC. Further, the UE 100 is configured to determine that the PLMN is discovered and displays the discovered PLMN to a user of the UE 100. The detailed operations for optimizing the NR frequency scanning, when the UE 100 is in the manual selection mode are explained in the FIGS. 8a and 8b.

Upon the scanning, the UE 100 is configured to connect to at least one frequency present from the second set of frequencies supported by the registered PLMN. In an embodiment, the UE 100 is configured to detect that the frequency in the second set of frequencies is associated with a band having a dual SCS capability having a higher Subcarrier Spacing and a lower Subcarrier Spacing and select a higher SCS value for scanning. Further, the UE 100 is configured to check presence of an energy signature and an associated frequency-segment (e.g., raster-segment) indicating a signal transmission over the frequency while scanning the band with the higher SCS. Further, the UE 100 is configured to decode an SSB with the higher SCS to camp on the frequency, if the energy signature is detected during the scanning and proceed for camping. Alternatively, the UE 100 is configured to detect an end of band if the energy signature is not detected during the scanning using the higher SCS.

Further, the UE 100 is configured to detect a failure in decoding the SSB with the higher SCS. Further, the UE 100 is configured to scan the frequency-segment using a lower SCS and decode the SSB with the lower SCS to camp to the frequency.

Figure 13:
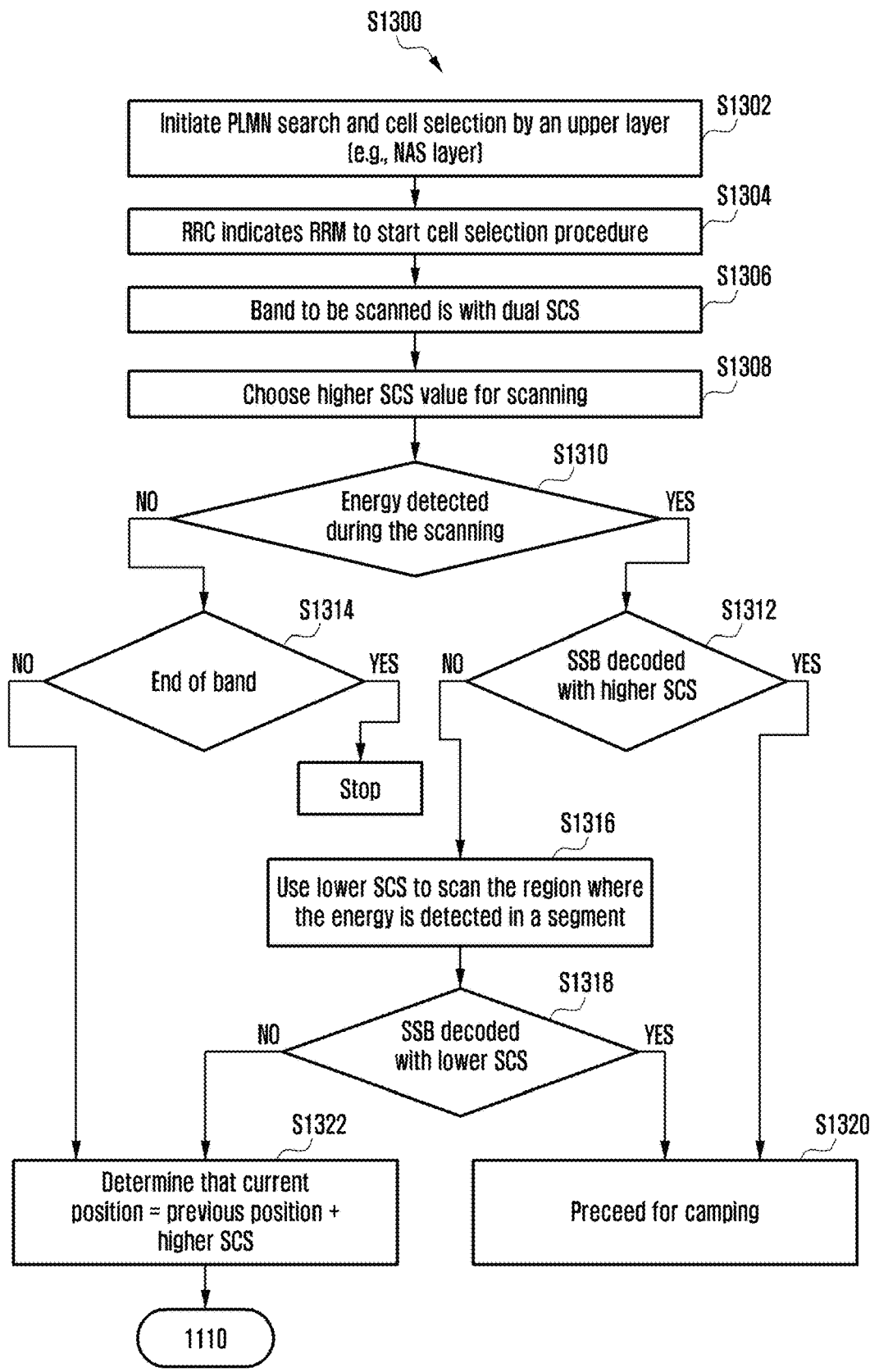
FIG. 13 illustrates a method to optimize NR frequency scanning during dual SCS bands operations, according to embodiments as disclosed herein.

The detailed operations for optimize NR frequency scanning during dual SCS bands operations are explained in the FIG. 13.

Further, the UE 100 is configured to trigger a full frequency band scan upon determining that the frequency from the second set of frequencies supported by the registered PLMN is not present. The full frequency band scan is triggered when the PLMN corresponding to the home MCC is not present in the memory, the PLMN corresponding to a roaming MCC is not present in the memory, the PLMN is not discovered, and the GSCN for the PLMN is not present in the memory.

In an example, the UE 100 went to the out-of-service in the home country. The MRU scan yields no result. The UE 100 performs the PLMN search for the RPLMN followed by the HPLMN and other priority PLMNs. While performing the full band scan for the selected PLMN, the UE 100 should search GSCN/Frequency as per selected PLMN from the GSCN-PLMN list first based on the proposed method. This would lead to faster NR camping without performing full-band search. The MRU scan stands for Most Recently Used Scan. The MRU is a very small database containing the ARFCN/BAND list on which the UE 100 has most recently camped on. The MRU DB contains maximum of 10 bands on which the UE has camped recently.

In another example, the UE 100 boots up in a new area where MRU frequency is not found, and the UE 100 performs the PLMN search for the RPLMN followed by the HPLMN and other priority PLMNs. While performing the full band scan for the selected PLMN, the UE 100 should search the GSCN/frequency as per selected PLMN from the GSCN-PLMN list first. This would lead to faster NR camping without performing Full-band Search.

In another example, the UE 100 boots up in a new country. Through the MCC scan, new country is detected. The UE 100 will not perform the RPLMN/HPLMN scan for this. Further, the UE 100 is expected to perform the full band scan on the OPLMN or random PLMN. While performing the full band scan for the selected PLMN, the UE 100 should search GSCN/Frequency as per selected PLMN from the GSCN-PLMN list first. This would lead to faster NR camping without performing full-band search.

In another example, the UE 100 boots up in a new area in a roaming country where the MRU frequency is not found. The UE 100 performs the PLMN search for RPLMN followed by the OPLMN and other priority PLMNs. While performing Full Band Scan for the selected PLMN, the UE should search GSCN/Frequency as per selected PLMN from the GSCN-PLMN list first. This would lead to faster NR camping without performing full-band search.

Full Band Scan Time: In an example, with scan time of each SSB as ~50 ms, time taken to perform full band scan shown in below table 5 based on the existing methods:

TABLE 5

| Bands | Full Band Scan Time |
| --- | --- |
| n2 (140 GSCNs) | ~7 sec |
| n5 (53 GSCNs) | ~3 sec |
| n41 (314 GSCNs) | ~16 sec |
| n77 (618 GSCNs) | ~31 sec |
| n78 (340 GSCNs) | ~17 sec |

TABLE 5-continued

| Bands | Full Band Scan Time |
| --- | --- |
| n79 (25 GSCNs) | ~1.5 sec |
| n260 (172 GSCNs)* | ~9 sec |
| Total (1662 GSCNs) | ~85 sec |

Based on the proposed method, the PLMN-GSCN list will reduce the scanning time significantly as the UE 100 will scan limited SSB frequencies on which NR cells are deployed as shown in the below table 6:

TABLE 6

| Bands | Number of PLMN-GSCN List in Each Band | Scanning Time |
| --- | --- | --- |
| n2 (140 GSCNs) | 5 | ~0.25 sec |
| n5 (53 GSCNs) | 2 | ~0.1 sec |
| n41 (314 GSCNs) | 5 | ~0.25 sec |
| n77 (618 GSCNs) | 1 | ~0.05 sec |
| n78 (340 GSCNs) | 10 | ~0.5 sec |
| n79 (25 GSCNs) | 1 | ~0.05 sec |
| n260 (172 GSCNs) | 2 | ~0.1 sec |
| Total | 26 GSCNs | ~1.3 sec |

Since the operators are deploying the NR cell on limited GSCNs, prior knowledge of GSCN will provide the location (for example, an exact location) of SSB frequency and thus the NR cell. The proposed method uses the prior information of the GSCN on which the NR cell is deployed in a PLMN and thus reduces the 5G full band scan time significantly. The proposed method can be used to optimize NR frequency scanning time by introducing the PLMN-GSCN List containing PLMN-GSCN information to be used by UE 100 for quick scan and procedures to find SSB Position in single search. The proposed solution further encapsulates and introduces optimization of SSB search for Dual SCS scenario in some bands. The overall user experience is enhanced and users the UE 100 get faster 5G service which would be a very important 5G KPI. The proposed feature can lead to a differentiating feature for the UE 100 over competitors by giving faster 5G camping experience.

Figure 5:
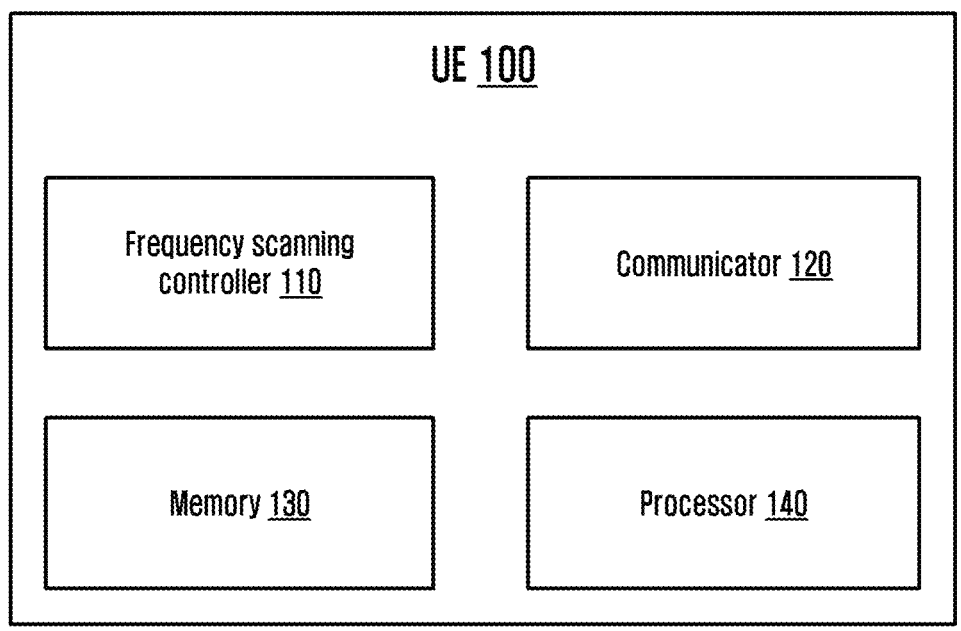
FIG. 5 illustrates various hardware components of a UE for handling the frequency scanning in the wireless communication network, according to embodiments as disclosed herein.

FIG. 5 illustrates various hardware components of the UE 100 for handling the frequency scanning in the wireless communication network 400, according to embodiments as disclosed herein. In an embodiment, the UE 100 includes a frequency scanning controller 110, a communicator 120, a memory 130 and a processor 140. The processor 140 is coupled with the frequency scanning controller 110, the communicator 120, and the memory 130. The memory 130 stores the MRU frequency list. The frequency scanning controller 110 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

In an embodiment, the frequency scanning controller 110 is configured to scan the first set of frequencies present in the MRU frequency list and detect the failure to connect the first set of frequencies present in the MRU frequency list. Further, the frequency scanning controller 110 is configured to determine the second set of frequencies supported by the registered PLMN. In an embodiment, the frequency scanning controller 110 is configured to acquire the PLMN-GSCN list. Based on the acquired PLMN-GSCN list, the frequency scanning controller 110 is configured to determine the GSCN associated with in the registered PLMN. Based on the determined GSCN, the frequency scanning controller 110 is configured to determine the second set of frequencies supported by the registered PLMN.

Further, the frequency scanning controller 110 is configured to scan the second set of frequencies supported by the registered PLMN. In an embodiment, the frequency scanning controller 110 is configured to determine whether the UE 100 is in the home PLMN. If the UE 100 is in the home PLMN then, the frequency scanning controller 110 is configured to indicate the physical layer to scan the GSCN corresponding to the HPLMN and the EPLMN. If the UE 100 is not in the home PLMN, the frequency scanning controller 110 is configured to indicate the physical layer to scan the GSCN corresponding to the RPLMN based on the MCC). Further, the frequency scanning controller 110 is configured to determine that the GSCN for the PLMN is present in the memory 130 and scan the GSCN retrieved from the memory 130 based on the determination. Further, the frequency scanning controller 110 is configured to identify the SSB from the scanned GSCN retrieved from the memory 130.

In another embodiment, the frequency scanning controller 110 is configured to determine whether the UE 100 is in the home MCC. If the UE 100 is in the home MCC, the frequency scanning controller 110 is configured to determine that the PLMN corresponding to the roaming MCC is present in the memory 130 and indicate a physical layer to scan the GSCN corresponding to the HPLMN and the EPLMN. If the UE 100 is not in the home MCC then, the frequency scanning controller 110 is configured to determine that the PLMN corresponding to the home MCC is present in the memory 130 and indicate the physical layer to scan the GSCN corresponding to the roaming PLMN based on the home MCC. Further, the frequency scanning controller 110 is configured to determine that the PLMN is discovered and display the discovered PLMN to the user of the UE 100 over a display (not shown).

Further, the frequency scanning controller 110 is configured to connect to the frequency present from the second set of frequencies supported by the registered PLMN based on the scanning. In an embodiment, the frequency scanning controller 110 is configured to detect that the frequency in the second set of frequencies is associated with the band having the SCS capability having the higher Subcarrier Spacing and the lower Subcarrier Spacing and select a higher SCS value for scanning. Further, the frequency scanning controller 110 is configured to check presence of the energy signature and the associated frequency-segment indicating the signal transmission over the frequency while scanning the band with the higher SCS. Further, the frequency scanning controller 110 is configured to decode the SSB with the higher SCS to camp on the frequency, if the energy signature is detected during the scanning and proceed for camping. Alternatively, the frequency scanning controller 110 is configured to detect an end of band if the energy signature is not detected during the scanning using the higher SCS.

Further, the frequency scanning controller 110 is configured to detect the failure in decoding the SSB with the higher SCS. Further, the frequency scanning controller 110 is configured to scan the frequency-segment using the lower SCS and decode the SSB with the lower SCS to camp to the frequency.

Further, the frequency scanning controller 110 is configured to trigger the full frequency band scan upon determining that the frequency from the second set of frequencies supported by the registered PLMN is not present.

In the automatic selection mode, if the UE 100 went out-of-service (OOS) or booted up in a new area (i.e., new country or roaming country) where MRU scan has not yielded any result then the proposed PLMN-GSCN list scanning will increase the chances of finding NR cells with reduced scan time using the frequency scanning controller 110.

in the manual selection mode, all bands are scanned in order to report every available PLMN of all the operators at the UE's location. Though the PLMN availability would be limited and available at certain GSCNs of the band but still complete search of all the 5G Bands will be done. There will be certain bands which might not have any PLMNs available. So, the proposed PLMN-GSCN List scanning will avoid scanning unnecessary bands and will reduce the manual scan time drastically using the frequency scanning controller 110.

The communicator 120 is configured for communicating internally between internal hardware components and with external devices via one or more networks. Further, the processor 140 is configured to execute instructions stored in the memory 130 and to perform various processes. The communicator 120 is configured for communicating internally between internal hardware components and with external devices via one or more networks. The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

At least one of the plurality of modules may be implemented through the AI model. A function associated with AI may be performed through the non-volatile memory, the volatile memory, and the processor 140. The processor 140 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 5 shows various hardware components of the UE 100, it is to be understood that other embodiments are not limited thereon. In other embodiments, the UE 100 may include less or more number of components. Further, the labels or names of the components are used only for illustrative purpose and does not limit the scope of the invention. One or more components can be combined together to perform same or substantially similar function in the UE 100.

Figure 6:
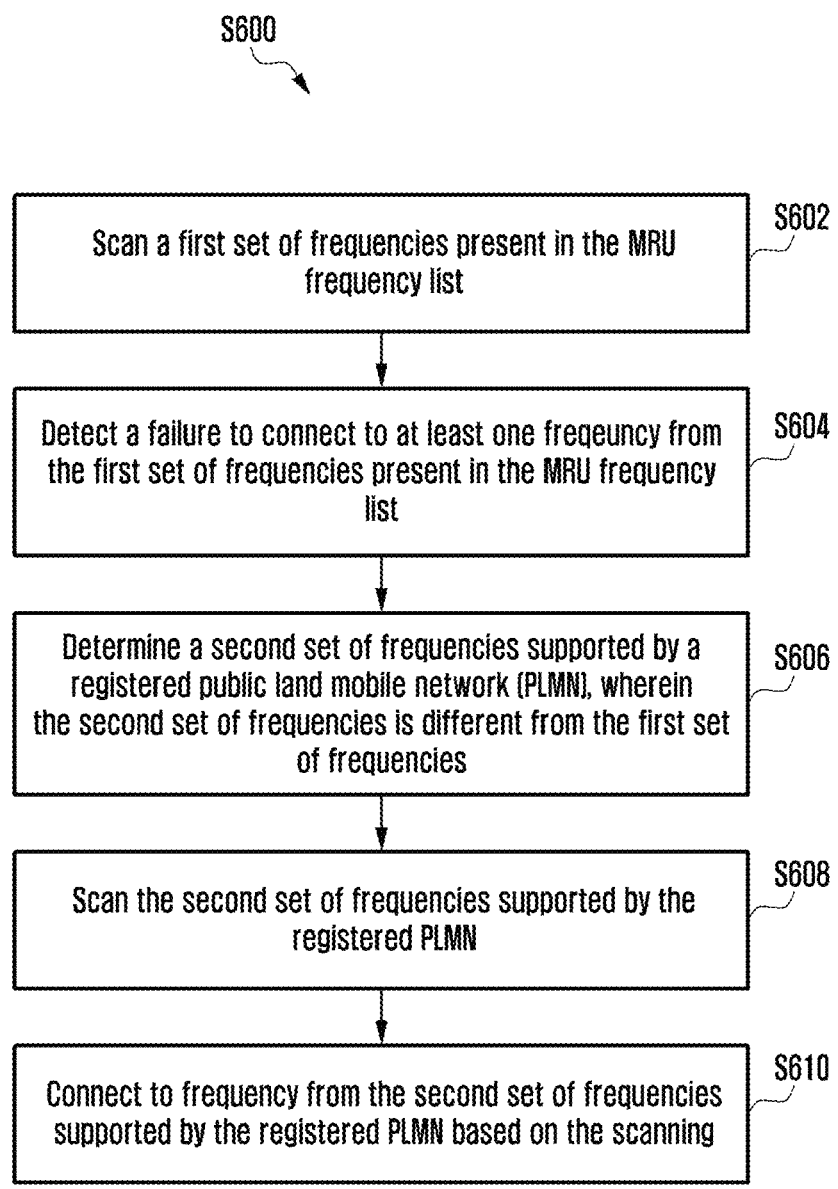
FIG. 6 illustrates a method for handling the frequency scanning in the wireless communication network, according to embodiments as disclosed herein.

FIG. 6 illustrates a method S600 for handling the frequency scanning in the wireless communication network 400, according to embodiments as disclosed herein. The operations (S602-S610) are handled by the frequency scanning controller 110.

At S602, the method includes scanning the first set of frequencies present in the MRU frequency list. At S604, the method includes detecting the failure to connect to the frequency from the first set of frequencies present in the MRU frequency list. At S606, the method includes determining the second set of frequencies supported by the registered PLMN. At S608, the method includes scanning the second set of frequencies supported by the registered PLMN. At S610, the method includes connecting to the frequency from the second set of frequencies supported by the registered PLMN based on the scanning.

The method can be used to optimize NR frequency scanning time by introducing the PLMN-GSCN list containing PLMN-GSCN information to be used by the UE 100 for quick scan and procedures to find SSB frequency position in single search. In the proposed method, in case of automatic network selection, camping will be faster by scanning the GSCN fetched from PLMN-GSCN list stored within the UE 100 and scanning just the corresponding GSCN values. Further, for roaming scenarios, the scan will be performed for the GSCNs corresponding to roaming MCC/PLMN and other entries would be skipped.

In the proposed method, in the manual selection mode, using just the corresponding GSCN values from the PLMN-GSCN list, the scanning will be faster as complete band scanning will not be required. If all PLMNs are found corresponding to MCC then complete band scan will not be required and if all PLMN entries corresponding to MCC are not available in local GSCN-PLMN list, then UE 100 will pull latest GSCN-PLMN List from the server 300 before the scan.

In the proposed methods, for bands supporting Dual SCS, the UE 100 to start scanning of bands using higher SCS because step size will be more. The scanning using highest SCS will have smaller steps with lower search time. The scanning with higher SCS will help in decoding both types of SCS.

In the proposed method, the different operators are deploying NR in different bands, but the GSCN used are limited. These operators choose certain RF channel frequency and SSB frequency based on spectrum allocation for NR deployment. Also, once the SSB positions are fixed by network operators based on GSCN, the SSB positions are not likely to change because of deployment planning, spectrum and other complexities. Since the operators are deploying NR on limited GSCNs, prior knowledge of GSCN will provide the location (for example, an exact location) of SSB frequency and thus the NR cell. The proposed method uses prior information of GSCN on which NR cell is deployed in a PLMN and thus reduces the 5G Full Band Scan time significantly. Further, the proposed method uses the below three step algorithm to reduce the 5G Full Band Scanning time for faster camping experience.

Figure 7:
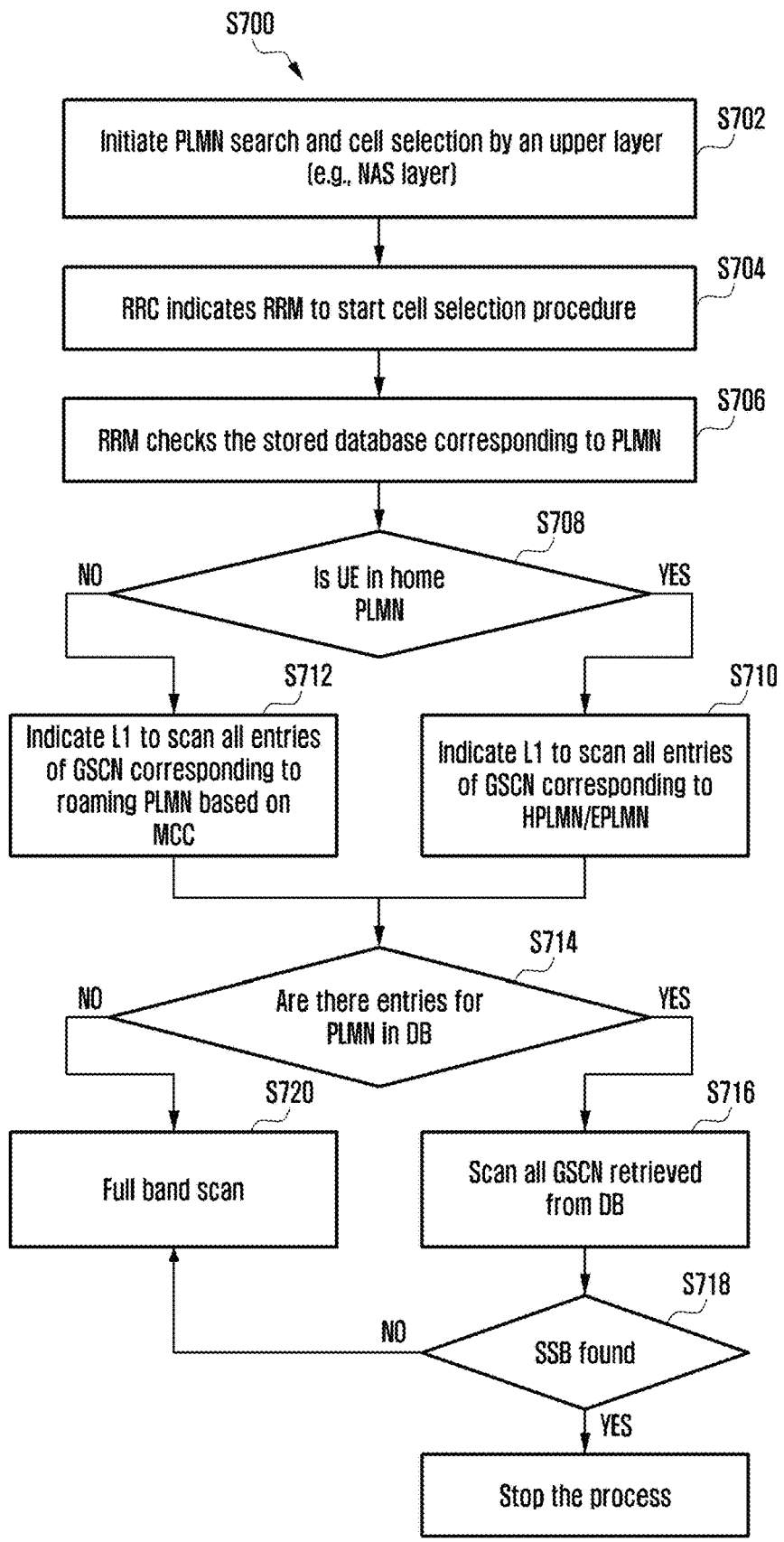
FIG. 7 illustrates a method for optimizing the NR frequency scanning when the UE is in the automatic selection mode, according to embodiments as disclosed herein.

FIG. 7 illustrates a method S700 for optimizing the NR frequency scanning when the UE 100 is in the automatic selection mode, according to embodiments as disclosed herein. The operations (S702-S718) are handled by the frequency scanning controller 110.

At S702, the method includes initiating the PLMN search and the cell selection by the upper layer (e.g., non-access stratum (NAS) layer). At S704, the method allows the Radio Resource Control (RRC) indicating the Radio Resources Management (RRM) to start the cell selection procedure. At S706, the method allows the RRM checking the stored memory corresponding to the PLMN. At S708, the method includes determining whether the UE 100 is in the home PLMN. If the UE 100 is in the home PLMN then, at S710, the method includes indicating the L1 layer to scan all entries of GSCN corresponding to the HPLMN and the EPLMN. If the UE 100 is not in the home PLMN then, at S712, the method includes indicating the L1 layer to scan all entries of GSCN corresponding to the roaming PLMN based on the MCC.

At S714, the method includes determining whether the entries are for the PLMN in the memory 130. If the entries are for the PLMN in the memory 130 then, at S716, the method includes scanning all GSCN retrieved from the memory 130. At S718, the method includes determining whether the SSB is found. If the SSB is not found then, at S720, the method includes performing the full band scan. If the entries are for the PLMN in the memory 130 then, at S720, the method includes performing the full band scan.

Figure 8A:
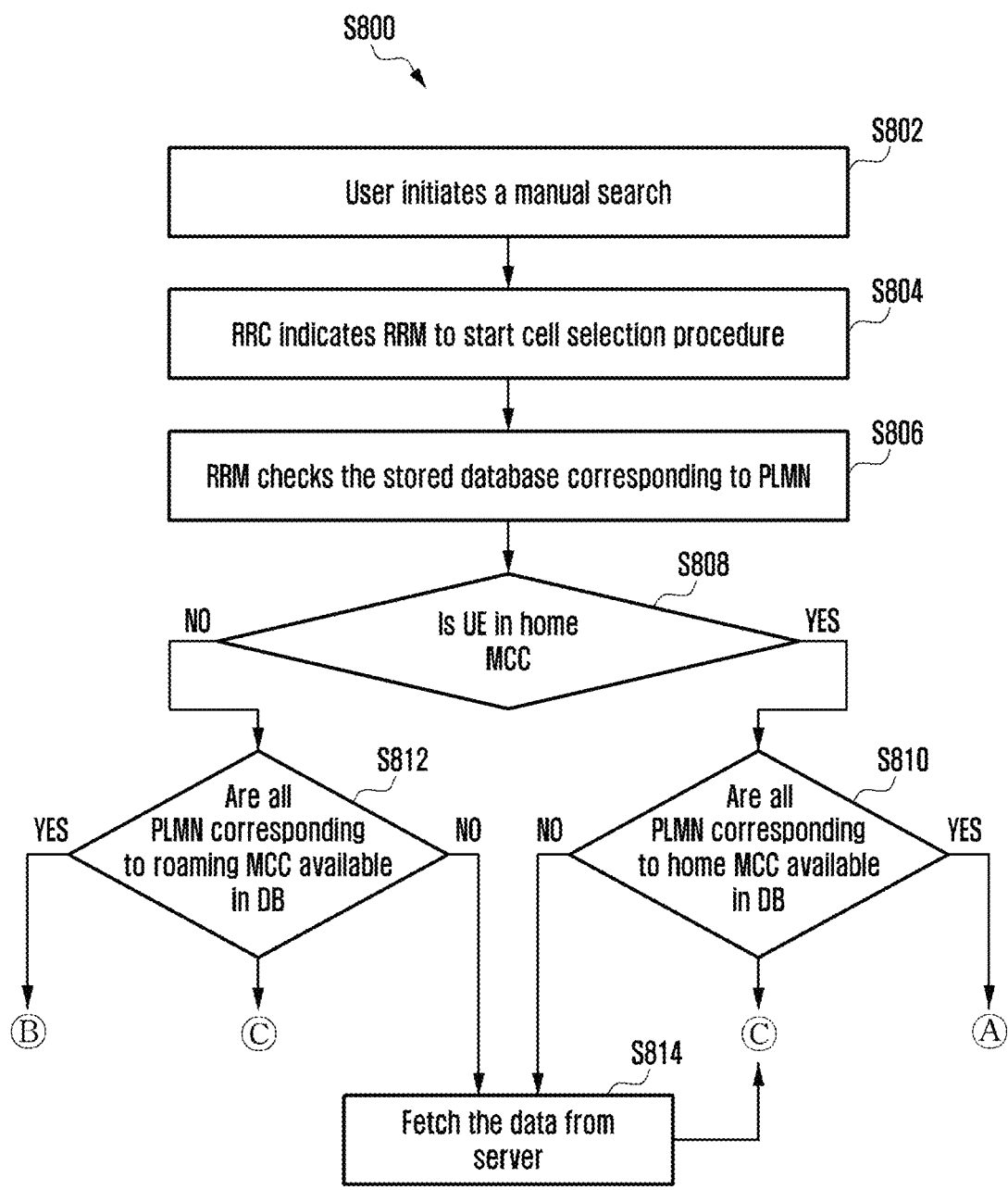
FIGS. 8a and 8b illustrate a method for optimizing the NR frequency scanning, when the UE is in the manual selection mode, according to embodiments as disclosed herein.
Figure 8B:
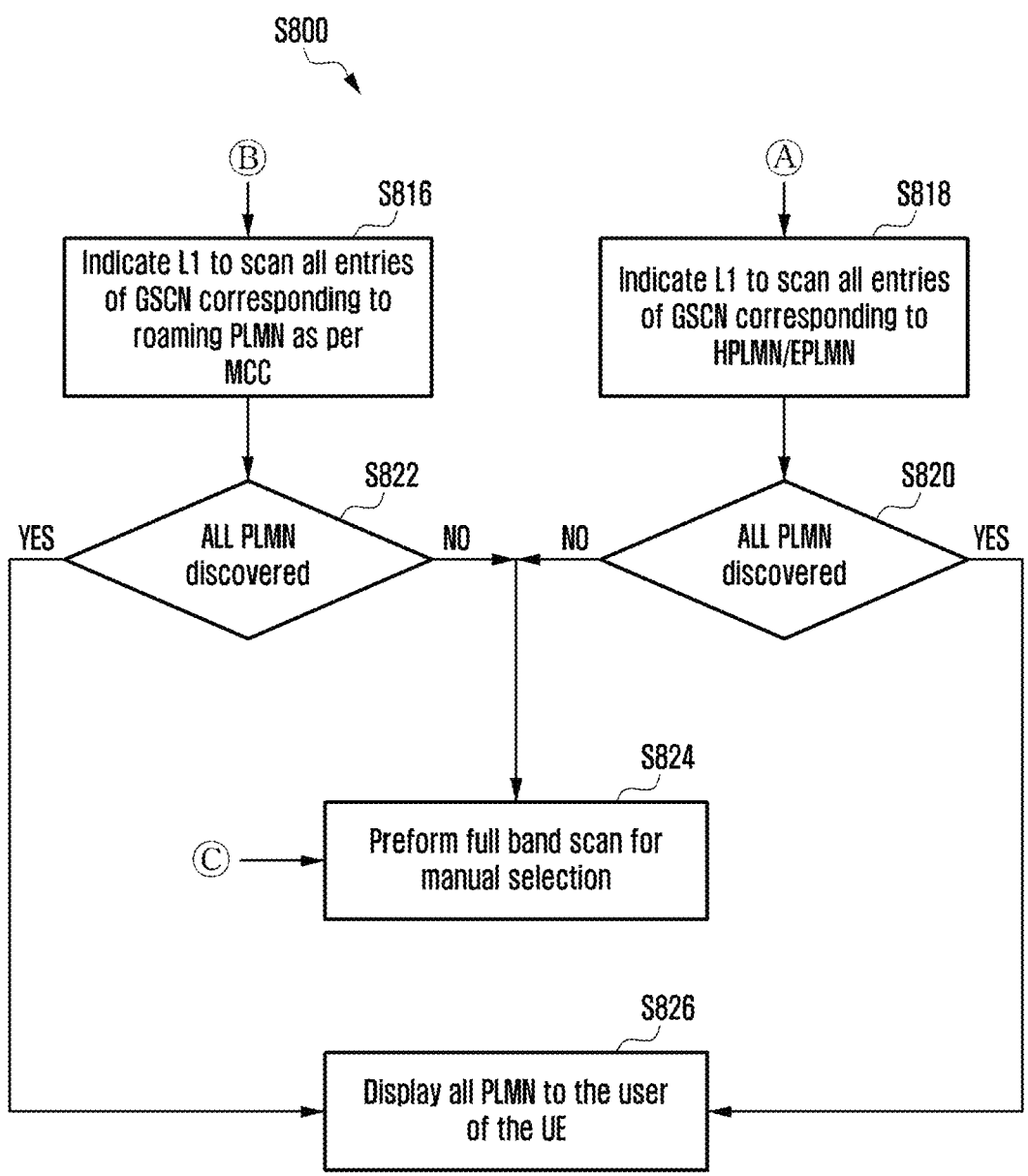

FIGS. 8a and 8b illustrates a method S800 for optimizing the NR frequency scanning, when the UE 100 is in the manual selection mode, according to embodiments as disclosed herein. The operations (S802-S826) are handled by the frequency scanning controller 110.

At S802, the user of the UE 100 initiates the manual search. At S804, the method includes the RRC indicating the RRM to start the cell selection procedure. At S806, the method includes the RRM checking the stored memory 130 corresponding to the PLMN. At S808, the method includes determining whether the UE 100 is in the home MCC. If the UE 100 is in the home MCC then, at S810, the method includes determining whether all PLMN corresponds to the home MCC available in the memory 130. If the UE 100 is not in the home MCC, at S812, the method includes determining whether all PLMN corresponds to the roaming MCC available in the memory 130. All PLMN does not correspond to the roaming MCC available in the memory 130 or all PLMN does not correspond to the home MCC available in the memory 130 then, at S814, the method includes fetching the data from the server 300.

If all PLMN corresponds to the home MCC available in the memory 130 then, at S818, the method includes indicating the L1 to scan all entries of the GSCN corresponding to the HPLMN and the EPLMN. If the PLMN corresponds to the roaming MCC available in the memory 130 then, at S816, the method includes indicating the L1 to scan all entries of GSCN corresponding to the roaming PLMN as per MCC.

At S820 and S822, the method includes determining whether all PLMN are discovered. If all PLMN are discovered then, at S826, the method includes displaying all PLMN to the user of the UE 100 on the display. If all PLMN are not discovered then, at S824, the method includes preforming the full band scan for manual selection.

Figure 9:
FIG. 9 illustrates an example in which UE optimizes the NR frequency scanning, while the UE is in an automatic selection mode, according to embodiments as disclosed herein.

FIG. 9 illustrates an example 900 in which the UE 100 optimizes the NR frequency scanning, while the UE 100 is in the automatic selection mode, according to embodiments as disclosed herein.

As shown in the FIG. 9, in this example 900, the band priority order be n41>n77>n78. In the current location, the only suitable cell 902 available for n78 is located at GSCN 8045 (i.e., $334^{th}$ position out of the 340 GSCN supported for n78 (GSCN 7711 to GSCN 8051)). Based on the proposed method, the automatic selection mode can be made faster by accessing the PLMN-GSCN list 904 stored within the UE 100 and scanning just the corresponding GSCN Value. The UE 100 will scan the GSCN fetched from PLMN-GSCN list 904 corresponding to the PLMN (GSCN 8045 for PLMN 450-02 in this case) before full scan. The SSB scan would take ~20 to ~50 ms and the UE 100 would save around 26-64 secs. The UE 100 would save a significant amount of time in the 5G camping and would give better user experience. Further, for the roaming scenarios, the UE 100 would just scan the GSCNs corresponding to roaming MCC/PLMN and other entries would be skipped.

To further increase reliability of scanning, the UE 100 can implement to scan two GSCNs before as well 2 GSCNs after the intended GSCN. Which means the UE 100 will scan five GSCNs which will take up to (20/50)*5=100–250 ms. In an example, GSCN 8045 ($334^{th}$ GSCN for n78) was in PLMN-GSCN List. The UE 100 will scan GSCNs from 8043 to 8047 of n78 to increase the reliability.

Figure 10:
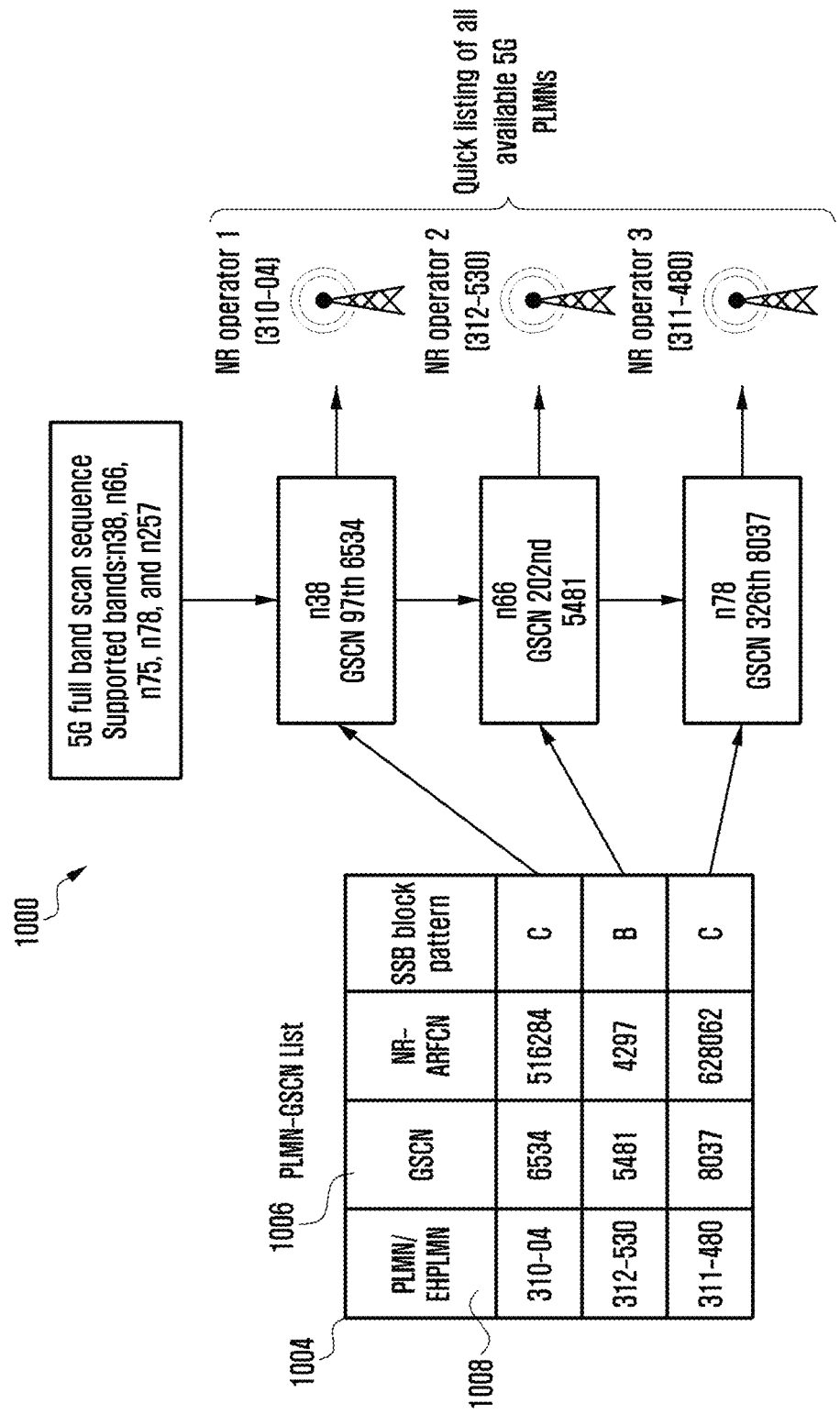
FIG. 10 illustrates an example in which UE optimizes the NR frequency scanning, while the UE is in the manual selection mode, according to embodiments as disclosed herein.

FIG. 10 illustrates an example 1000 in which the UE 100 optimizes the NR frequency scanning, while the UE 100 is in the manual selection mode, according to embodiments as disclosed herein.

As shown in the FIG. 10, in this example 1000, the supported bands by the UE 100 be n38, n66, n75, n78, n257. Based on the proposed method, the PLMN-GSCN list 1004 would contain GSCN 1006 corresponding to every PLMN 1008 in the MCC. Using just the corresponding GSCN values, manual selection mode scanning would be faster as full band scanning would not be required. If all PLMNs are found corresponding to the MCC then complete band scan will not be required. The UE 100 would save a significant amount of time as a lot of GSCN scans would be avoided. If all PLMN entries corresponding to the MCC are not available in the local GSCN-PLMN list stored in the memory 130, then the UE 100 can retrieve the latest GSCN-PLMN list from the server 300 before the manual scan. Further, for roaming scenarios, the UE 100 would just scan the GSCNs corresponding to roaming MCC and other entries would be skipped.

Figure 11:
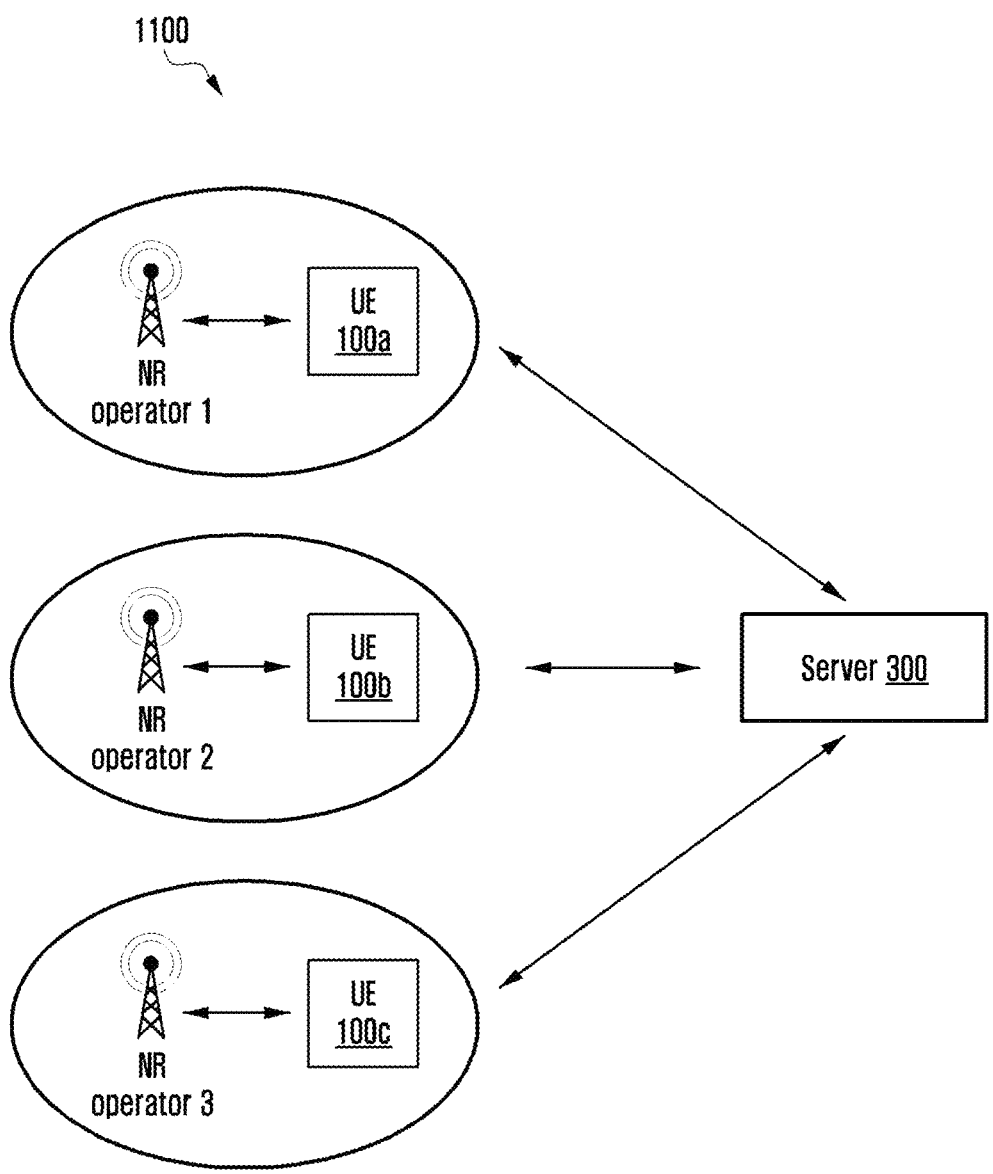
FIG. 11 illustrates an example in which a method for optimizing NR frequency scanning by maintaining PLMN-GSCN list, according to embodiments as disclosed herein.

FIG. 11 illustrates an example 1100 in which the UE 100 optimizes the NR frequency scanning by maintaining PLMN-GSCN list, according to embodiments as disclosed herein. The purpose of the PLMN-GSCN list is for quick access to the SSB position in the band. The PLMN-GSCN List includes entries as the PLMN/EPLMN, the GSCN, the NR-ARFCN and the SSB block pattern. The PLMN-GSCN list can be stored locally by the UE 100 and updated regularly with help from the server 300 to obtain the exact GSCN for NR cell in the PLMN. The PLMN-GSCN list will reduce the scanning time significantly as the UE 100 will scan limited SSB frequencies on which the NR cells are deployed.

As shown in the FIG. 11, the UEs 100a-100c connected with the NR operators, respectively, will feed the data to the server 300. The PLMN-GSCN list will be used to feed the UEs 100a-100c. In this way, the UE 100a-100c will know the NR operators in each area and the frequency each of the NR operators are operating with the SSB location.

The proposed method will do an additional quick scan of frequencies from the proposed PLMN-GSCN list which was not scanned as part of MRU frequency. Since this proposed PLMN-GSCN list will be maintained through the server 300, the server would store a mostly exhaustive list and the list will be built continuously with new deployments, with the proposed implementation, the UE 100 would almost obtain all frequencies for a PLMN and while doing a PLMN selection full band scan would mostly not be needed.

Figure 12:
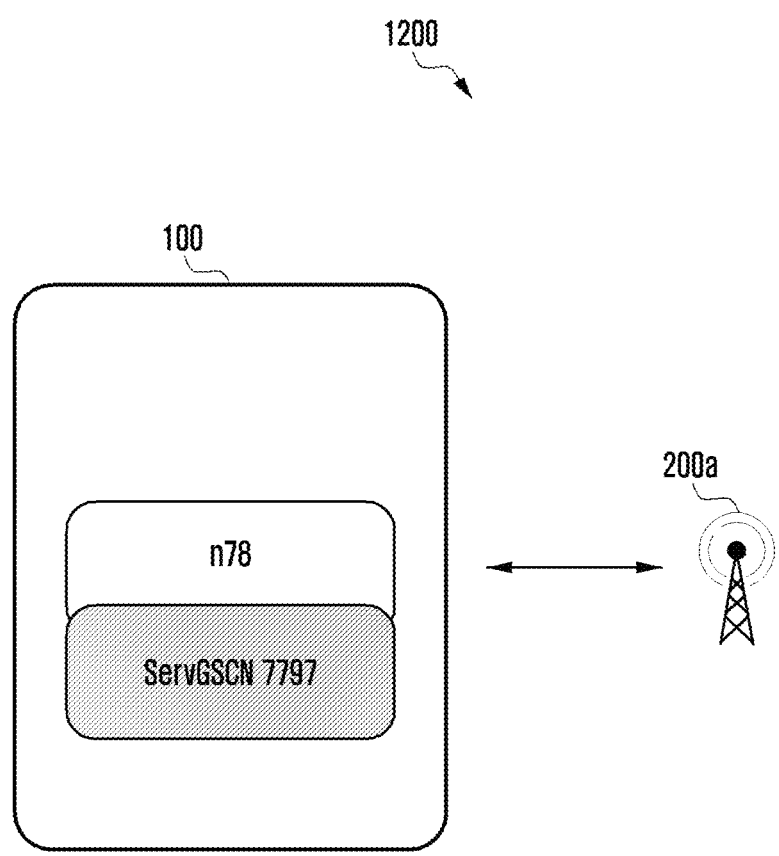
FIG. 12 illustrates an example in which the UE optimizes the NR frequency scanning by performing quick scan using a PLMN-GSCN List, according to embodiments as disclosed herein.

FIG. 12 illustrates an example 1200 in which the UE 100 optimizes the NR frequency scanning by performing quick scan using a PLMN-GSCN list, according to embodiments as disclosed herein. The UE 100 stores and fetches the GSCN and SSB information using the PLMN-GSCN list. Instead of scanning for all the GSCNs, the UE 100 performs the quick scan of the GSCN value using the PLMN-GSCN list as per the current MCC/PLMN and selects the SSB. If the SSB is found, the UE 100 would start the camping procedure otherwise the UE 100 fallbacks to full band 5G scan.

As shown in the FIG. 12, only one GSCN entry was there in the PLMN-GSCN list corresponding to the PLMN, so the GSCN 7797 will be scanned for scanning operation and UE 100 needs not scanning for all the GSCNs. This results in enhancing the user experience.

According to various embodiments, a User Equipment (UE) 100 for handling frequency scanning in a wireless communication network is disclosed. The UE comprises a processor 140, a memory 130 comprising a Most Recently Used (MRU) frequency list; and a frequency scanning controller 110, coupled with the processor and the memory, configured to scan a first set of frequencies present in the MRU frequency list, detect a failure to connect to at least one frequency from the first set of frequencies present in the MRU frequency list, determine a second set of frequencies supported by a registered public land mobile network (PLMN), wherein the second set of frequencies is different from the first set of frequencies, scan the second set of frequencies supported by the registered PLMN, and connect to at least one frequency from the second set of frequencies supported by the registered PLMN based on the scanning.

According to various embodiments, the UE 100 is configured to determine the second set of frequencies supported by the registered PLMN comprises acquire a PLMN-Global Synchronization Channel Number (PLMN-GSCN) list; determine at least one GSCN associated with the registered PLMN based on the acquired PLMN-GSCN list; and determine the second set of frequencies supported by the registered PLMN based on the determined GSCN.

According to various embodiments of the UE 100, the PLMN-GSCN list comprises at least one of the PLMN, an Equivalent PLMN (EPLMN), the GSCN, a New Radio Absolute Radio Frequency Channel Number (NR-ARFCN), or a Synchronization Signal Block (SSB) block pattern.

According to various embodiments, the UE 100 is configured to scan the second set of frequencies supported by the registered PLMN comprises determine whether the UE 100 is in a home PLMN; perform one of: indicate a physical layer to scan at least one GSCN corresponding to at least one of a home PLMN (HPLMN) or an EPLMN upon determining that the UE 100 is in the home PLMN, and indicate a physical layer to scan at least one GSCN corresponding to a roaming PLMN (RPLMN) based on a Mobile Country code (MCC) upon determining that the UE 100 is not in the home PLMN; determine that the at least one GSCN for the PLMN is present in the memory 130; scan the at least one GSCN retrieved from the memory 130 based on the determination; and identifying a SSB from the at least one scanned GSCN retrieved from the memory 130.

According to various embodiments, the UE 100 is configured to scan the second set of frequencies supported by the registered PLMN comprises determine whether the UE 100 is in a home MCC; perform one of: determine that at least one PLMN corresponding to a roaming MCC is present in the memory 130 upon determine that the UE 100 is in the home MCC and indicate a physical layer to scan at least one GSCN corresponding to at least one a HPLMN and an EPLMN, and determine that at least one PLMN corresponding to a home MCC is present in the memory 130 upon determine that the UE 100 is not in the home MCC and indicate a physical layer to scan the at least one GSCN corresponding to a roaming PLMN based on the home MCC; determine that the at least one PLMN is discovered; and cause to display the at least one discovered PLMN to a user of the UE 100.

According to various embodiments, the frequency scanning controller 110 is configured to trigger a full frequency band scan upon determining that the at least one frequency from the second set of frequencies supported by the registered PLMN is not present.

According to various embodiments, the UE 100, the full frequency band scan is triggered when at least one PLMN corresponding to a home MCC is not present in the memory 130, the at least one PLMN corresponding to a roaming MCC is not present in the memory 130, the at least one PLMN is not discovered, and at least one GSCN for the at least one PLMN is not present in the memory 130.

According to various embodiments, the UE 100 is configured to connect to the at least one frequency present from the second set of frequencies supported by the registered PLMN comprises: detect that at least one frequency in the second set of frequencies is associated with a band having a dual Subcarrier Spacing (SC S) capability having a higher Subcarrier Spacing and a lower Subcarrier Spacing; select a higher SCS value for scanning; check presence of an energy signature and an associated frequency-segment indicating a signal transmission over the at least one frequency while scanning the band with the higher SCS; and perform one of: decode a SSB with the higher SCS to camp on the at least one frequency, if the energy signature is detected during the scanning and proceed for camping, and detect an end of band if the energy signature is not detected during the scanning using the higher SCS.

According to various embodiments of UE 100, the frequency scanning controller 110 is configured to: detect a failure in decoding the SSB with the higher SCS; scan the frequency-segment using a Lower SCS; and decode the SSB with the Lower SCS to camp to the at least one frequency.

According to various embodiments, the UE 100, the second set of frequencies supported by the registered PLMN is determined when the UE 100 is in at least one of a roaming area, an out of service (OOS) area, or a new service area.

According to various embodiments, the UE 100, the MRU list comprises at least one frequency information associated with at least one band connected by the UE 100 over a period of time.

According to various embodiments, information on the second set of frequencies supported by the registered PLMN is maintained by the UE 100 or a network element 200.

According to various embodiments, information on the second set of frequencies supported by the registered PLMN is maintained and updated by a server 300, wherein the server 300 sends an update about a PLMN-GSCN list to the UE 100.

FIG. 13 illustrates a method S1300 to optimize NR frequency scanning during the dual SCS bands operations, according to embodiments as disclosed herein. The operations S1302-S1322 are handled by the frequency scanning controller 110.

At S1302, the method includes initiating the PLMN search and cell selection by the upper layer (e.g., NAS layer). At S1304, the method allows the RRC indicating the RRM to start the cell selection procedure. At S1306, the method includes that the band to be scanned is with the dual SCS. At S1308, the method includes choosing the higher SCS value for scanning. At S1310, the method includes determining whether the energy (e.g., energy signature) is detected during the scanning. If energy is detected during the scanning, then, at S1312, the method includes determining whether the SSB is decoded with the higher SCS. If energy is not detected during the scanning, then, at S1314, the method includes determining whether the end of band is detected.

If the SSB is decoded with the higher SCS then, at S1320, the method includes proceeding for camping. If the SSB is not decoded with the higher SCS then, at S1316, the method includes using the lower SCS to scan the region where the energy is detected in the segment. At S1318, the method includes determining whether the SSB is decoded with the smaller SCS. If the SSB is decoded with the smaller SCS then, at S1320, the method includes proceeding for camping. If the SSB is not decoded with the smaller SCS then, at S1322, the method includes determining that current position (i.e., previous position+higher SCS). If the end of band is not detected then, at S1322, the method includes determining that current position (i.e., previous position+higher SCS).

In other way, the UE 100 is configured to detect that the frequency in the second set of frequencies is associated with a band having a dual SCS capability. The dual SCS capability includes a higher SCS and a lower SCS. The UE 100 is configured to select a higher SCS value for scanning. Further, the UE 100 is configured to check presence of the energy signature and the associated frequency-segment indicating the signal transmission over the frequency while scanning the band with the higher SCS. Further, the UE 100 is configured to decode the SSB with the higher SCS to camp on the frequency, if the energy signature is detected during the scanning and proceed for camping. Alternatively, the UE 100 is configured to detect an end of band if the energy signature is not detected during the scanning using the higher SCS. Further, the UE 100 is configured to detect the failure in decoding the SSB with the higher SCS. Further, the UE 100 is configured to scan the frequency-segment using a lower SCS and decode the SSB with the lower SCS to camp to the frequency.

Figure 14:
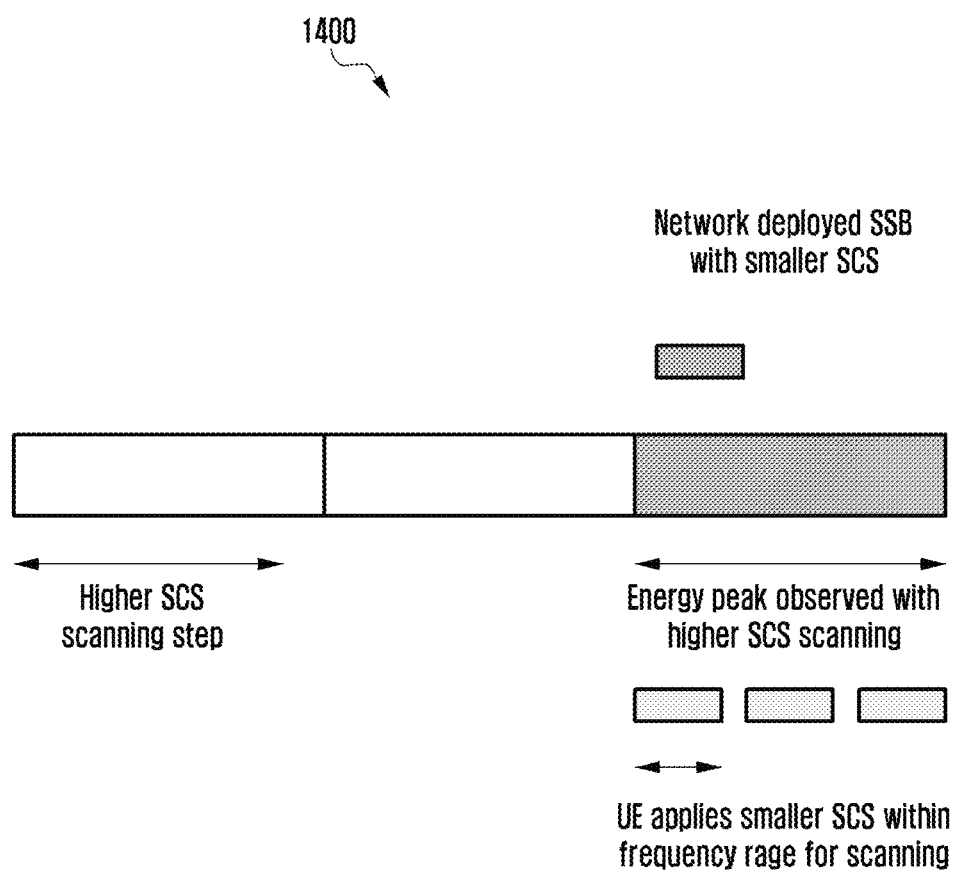
FIG. 14 illustrates an example in which Dual SCS bands operations are depicted, according to embodiments as disclosed herein.

FIG. 14 illustrates an example 1400 in which the dual SCS bands operations are depicted, according to embodiments as disclosed herein. As shown in the FIG. 14, the NR bands like n5, n66, n257, n258, n260, n261 supports dual SCS for SSBs. In these bands, frequency scanning is performed twice. First with one SCS and second with another SCS. So, for bands supporting Dual SCS, the UE 100 to start scanning of bands using higher SCS because step size will be more. The scanning using highest SCS will have smaller steps with lower search time. The scanning with higher SCS will help in decoding both types of SCS. If the operator has deployed NR cell with the smaller SCS of the two dual SCS then, as the UE 100 is going to use the higher SCS for scanning, the UE 100 will find an energy peak at some region in band but will not be able to decode due to wrong SCS. Now within that frequency region of energy peak, the UE 100 will apply smaller SCS for scanning to get SSB. This will reduce scanning time and will make sure that with single SCS scanning, any of dual SCS SSB can be found.

The various actions, acts, blocks, steps, or the like in the flow charts (S600-S800 and S1300) may be performed in the order presented, in a different order or simultaneously. Further, in some embodiments, some of the actions, acts, blocks, steps, or the like may be omitted, added, modified, skipped, or the like without departing from the scope of the invention. The various actions in method may be performed in the order presented, in a different order or simultaneously. The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

What is claimed is:

1. A method for handling frequency scanning in a wireless communication network, the method comprising:
scanning, by a User Equipment (UE), a first set of frequencies present in a Most Recently Used (MRU) frequency list to camp on to the network;
detecting, by the UE, a failure to connect to at least one frequency from the first set of frequencies present in the MRU frequency list to camp on to the network based on scanning of the first set of frequencies;
determining, by the UE, a second set of frequencies supported by a registered public land mobile network (PLMN) based on a PLMN-Global Synchronization Channel Number (PLMN-GSCN) list, wherein the second set of frequencies is different from the first set of frequencies;

scanning, by the UE, the second set of frequencies supported by the registered PLMN; and connecting, by the UE, to at least one frequency from the second set of frequencies supported by the registered PLMN to camp on to the network based on the scanning of the second set of frequencies.

2. The method as claimed in claim 1, wherein determining, by the UE, the second set of frequencies supported by the registered PLMN comprises:

acquiring, by the UE, a PLMN-Global Synchronization Channel Number (PLMN-GSCN) list;

determining, by the UE, at least one GSCN associated with the registered PLMN based on the acquired PLMN-GSCN list; and determining, by the UE, the second set of frequencies supported by the registered PLMN based on the at least one determined GSCN.

3. The method as claimed in claim 2, wherein the PLMN-GSCN list comprises at least one of the PLMN, an Equivalent PLMN (EPLMN), the GSCN, a New Radio Absolute Radio Frequency Channel Number (NR-ARFCN), and a Synchronization Signal Block (SSB) block pattern.

4. The method as claimed in claim 1, wherein scanning, by the UE, the second set of frequencies supported by the registered PLMN comprises:

determining, by the UE, whether the UE is in a home PLMN;

performing, by the UE, one of:
  indicating a physical layer to scan at least one Global Synchronization Channel Number (GSCN) corresponding to at least one of a home PLMN (HPLMN) or an Equivalent PLMN upon determining that the UE is in the home PLMN, or
  indicating a physical layer to scan at least one GSCN corresponding to a roaming PLMN (RPLMN) based on a Mobile Country code (MCC) upon determining that the UE is not in the home PLMN;

determining, by the UE, that the at least one GSCN for the PLMN is present in a memory of the UE;

scanning, by the UE, the at least one GSCN retrieved from the memory based on the determination of whether the UE is in the home PLMN; and identifying, by the UE, a Synchronization Signal Block (SSB) from the at least one scanned GSCN retrieved from the memory.

5. The method as claimed in claim 1, wherein scanning, by the UE, the second set of frequencies supported by the registered PLMN comprises:

determining, by the UE, whether the UE is in a home Mobile Country code (MCC);

performing, by the UE, one of:
  determining that at least one PLMN corresponding to a roaming MCC is present in a memory of the UE upon determining that the UE is in the home MCC and indicating a physical layer to scan at least one Global Synchronization Channel Number (GSCN) corresponding to at least one a home PLMN and an Equivalent PLMN, and
  determining that at least one PLMN corresponding to the home MCC is present in the memory upon determining that the UE is not in the home MCC and indicating a physical layer to scan the at least one GSCN corresponding to a roaming PLMN based on the home MCC;

determining, by the UE, that the at least one PLMN is discovered; and displaying, by the UE, the at least one discovered PLMN to a user of the UE.

6. The method as claimed in claim 1, wherein the method further comprises:

triggering, by the UE, a full frequency band scan upon determining that the at least one frequency from the second set of frequencies supported by the registered PLMN is not present.

7. The method as claimed in claim 6, wherein the full frequency band scan is triggered when at least one PLMN corresponding to a home Mobile Country code (MCC) is not present in a memory of the UE, the at least one PLMN corresponding to a roaming MCC is not present in the memory, the at least one PLMN is not discovered, and at least one Global Synchronization Channel Number (GSCN) for the at least one PLMN is not present in the memory.

8. The method as claimed in claim 1, wherein connecting, by the UE, to the at least one frequency present from the second set of frequencies supported by the registered PLMN comprises:

detecting, by the UE, that at least one frequency in the second set of frequencies is associated with a band that includes a dual Subcarrier Spacing (SCS) capability, the SCS capability including a higher SCS and a lower SCS;

selecting, by the UE, a higher SCS value for scanning;

checking, by the UE, presence of an energy signature and an associated frequency-segment indicating a signal transmission over the at least one frequency while scanning the band with the higher SCS; and performing, by the UE, one of:
  decoding a Synchronization Signal Block (SSB) with the higher SCS to camp on the at least one frequency in response to detecting the energy signature during the scanning and proceeding for camping; and
  detecting an end of band in response to determining the energy signature is not detected during the scanning of the band with the higher SCS using the higher SCS value.

9. The method as claimed in claim 8, wherein the method further comprises:

detecting a failure in decoding the SSB with the higher SCS value;

scanning, by the UE, the associated frequency-segment using a lower SCS; and decoding, by the UE, the SSB with the lower SCS to camp to the at least one frequency present from the second set of frequencies supported by the registered PLMN.

10. The method as claimed in claim 1, further comprising determining the second set of frequencies supported by the registered PLMN based on the UE being in at least one of a roaming area, an out of service (OOS) area, or a new service area.

11. The method as claimed in claim 1, wherein the MRU list comprises at least one frequency information associated with at least one band connected by the UE over a period of time.

12. The method as claimed in claim 1, wherein information on the second set of frequencies supported by the registered PLMN is maintained by at least one of the UE or a network element.

13. The method as claimed in claim 1, wherein information on the second set of frequencies supported by the registered PLMN is maintained and updated by a server, and wherein the server sends an update about a PLMN-Global Synchronization Channel Number list to the UE.

14. A User Equipment (UE) for handling frequency scanning in a wireless communication network, the UE comprising:
a processor;
a memory storing a Most Recently Used (MRU) frequency list; and
a frequency scanning controller coupled with the processor and the memory, the frequency scanning controller configured to:
scan a first set of frequencies present in the MRU frequency list to camp on to the network;
detect a failure to connect to at least one frequency from the first set of frequencies present in the MRU frequency list to camp on to the network based on scanning of the first set of frequencies;
determine a second set of frequencies supported by a registered public land mobile network (PLMN) based on a PLMN-Global Synchronization Channel Number (PLMN-GSCN) list, wherein the second set of frequencies is different from the first set of frequencies;
scan the second set of frequencies supported by the registered PLMN; and
connect to at least one frequency from the second set of frequencies supported by the registered PLMN to camp on to the network based on the scanning of the second set of frequencies.

15. The UE as claimed in claim 14, wherein the processor is further configured to determine the second set of frequencies supported by a registered PLMN by:
acquiring a PLMN-Global Synchronization Channel Number (PLMN-GSCN) list;
determining at least one GSCN associated with the registered PLMN based on the acquired PLMN-GSCN list; and
determining the second set of frequencies supported by the registered PLMN based on the at least one determined GSCN.

16. The UE as claimed in claim 15, wherein the PLMN-GSCN list comprises at least one of the PLMN, an Equivalent PLMN (EPLMN), the GSCN, a New Radio Absolute Radio Frequency Channel Number (NR-ARFCN), or a Synchronization Signal Block (SSB) block pattern.

17. The UE as claimed in claim 14, wherein the processor is further configured to scan the second set of frequencies supported by the registered PLMN by:
determining whether the UE is in a home PLMN;
performing one of:
indicating a physical layer to scan at least one Global Synchronization Channel Number (GSCN) corresponding to at least one of a home PLMN (HPLMN) or an Equivalent PLMN upon determining that the UE is in the home PLMN, or
indicating a physical layer to scan at least one GSCN corresponding to a roaming PLMN (RPLMN) based on a Mobile Country code (MCC) upon determining that the UE is not in the home PLMN;
determining that the at least one GSCN for the PLMN is present in a memory of the UE;
scanning the at least one GSCN retrieved from the memory based on the determination of whether the UE is in the home PLMN; and
identifying a Synchronization Signal Block (SSB) from the at least one scanned GSCN retrieved from the memory.

18. The UE as claimed in claim 14, wherein the processor is further configured to scan the second set of frequencies supported by the registered PLMN by:
determining whether the UE is in a home Mobile Country code (MCC);
performing one of:
determining that at least one PLMN corresponding to a roaming MCC is present in a memory of the UE upon determining that the UE is in the home MCC and indicating a physical layer to scan at least one Global Synchronization Channel Number (GSCN) corresponding to at least one a home PLMN and an Equivalent PLMN, and
determining that at least one PLMN corresponding to the home MCC is present in the memory upon determining that the UE is not in the home MCC and indicating a physical layer to scan the at least one GSCN corresponding to a roaming PLMN based on the home MCC;
determining that the at least one PLMN is discovered; and
displaying the at least one discovered PLMN to a user of the UE.

19. The UE as claimed in claim 14, wherein the processor is further configured to:
trigger a full frequency band scan upon determining that the at least one frequency from the second set of frequencies supported by the registered PLMN is not present.

20. The UE as claimed in claim 19, wherein the full frequency band scan is triggered when at least one PLMN corresponding to a home Mobile Country code (MCC) is not present in a memory of the UE, the at least one PLMN corresponding to a roaming MCC is not present in the memory, the at least one PLMN is not discovered, and at least one Global Synchronization Channel Number (GSCN) for the at least one PLMN is not present in the memory.

* * * * *